United States Patent [19]

Beck et al.

[11] Patent Number: 5,264,203

[45] Date of Patent: *Nov. 23, 1993

[54] SYNTHETIC MESOPOROUS CRYSTALLINE MATERIALS

[75] Inventors: Jeffrey S. Beck, Princeton, N.J.; Charles T. Kresge, West Chester, Pa.; Michael E. Leonowicz, Medford Lakes; Wieslaw J. Roth, Sewell, both of N.J.; James C. Vartuli, West Chester, Pa.

[73] Assignee: Mobil Oil Corporation, Fairfax, Va.

[*] Notice: The portion of the term of this patent subsequent to Apr. 7, 2009 has been disclaimed.

[21] Appl. No.: 735,224

[22] Filed: Jul. 24, 1991

Related U.S. Application Data

[63] Continuation-in-part of Ser. No. 625,245, Dec. 10, 1990, Pat. No. 5,098,684, which is a continuation-in-part of Ser. No. 470,008, Jan. 25, 1990, Pat. No. 5,102,643.

[51] Int. Cl.⁵ .............................................. C01B 33/34
[52] U.S. Cl. ............................................................ 423/703
[58] Field of Search ............... 423/328, 305, 306, 329, 423/700, 308.2, 703; 502/208, 214

[56] References Cited

U.S. PATENT DOCUMENTS

| | | | |
|---|---|---|---|
| 5,057,296 | 10/1991 | Beck | 423/277 |
| 5,102,643 | 4/1992 | Kresge et al. | 423/328 |
| 5,110,572 | 5/1992 | Calabro et al. | 423/328 |
| 5,112,589 | 5/1992 | Johnson et al. | 523/328 |

OTHER PUBLICATIONS

"Ultralarge Pore Molecular Sieves", P. A. Jacobs & R. A. vanSanten, 1989, pp. 439-446.

Primary Examiner—R. Bruce Breneman
Attorney, Agent, or Firm—Alexander J. McKillop; Dennis P. Santini; Laurence P. Hobbes

[57] ABSTRACT

This invention relates to a new synthetic composition of ultra-large pore crystalline material, e.g., [metallo]-silicoaluminophosphate, having a composition, expressed on an anhydrous basis as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; $(a+b+c+d)=1$; $a \geq 0$; b, c, and d are each $>0$; and h is a number of from 1 to 2.5. The crystalline material is prepared by i) crystallizing a reaction mixture comprising sources of W, X, Z and an organic directing agent; ii) contacting the product of i) with a reaction mixture comprising sources of Y and organic directing agent; and iii) maintaining the mixture of ii) under conditions sufficient to form said composition of matter. The composition is suited to use for catalytic conversion of organic compounds.

17 Claims, 28 Drawing Sheets

FIG. 23 BENZENE SORPTION ISOTHERM FOR MCM-41 TYPE MATERIAL

BENZENE SORPTION ISOTHERM FOR MCM-41 TYPE MATERIAL

SYNTHETIC MESOPOROUS CRYSTALLINE MATERIALS

CROSS-REFERENCE TO RELATED APPLICATIONS

This application is a continuation-in-part of application Ser. No. 07/625,245 filed Dec. 10, 1990, now U.S. Pat. No. 5,098,684, which in turn is a continuation-in-part of application Ser. No. 07/470,008, filed Jan. 25, 1990 now U.S. Pat. No. 5,102,643, the contents of each being incorporated herein by reference.

BACKGROUND OF THE INVENTION

1. Field of the Invention

This invention relates to novel compositions of synthetic ultra-large pore crystalline materials, e.g., [metallo]silicoaluminophosphates, their method of preparation and their use as a sorbent or a catalyst component. The term metallo]silicoaluminophosphate comprises both silicoaluminophosphates and metallosilicoaluminophosphate materials, the bracketed "metallo" indicating the optional presence of metal.

2. Description of the Prior Art

Porous inorganic solids have found great utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$, in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886);

zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content.

Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, Memoir Presented to the Chemical Society, No. 392, "Study of Aluminum Phosphate and Trivalent Iron", Jul. 6, 1961 (received), pp. 1762-1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, Nature, Vol. 306, No. 5941, pp. 356-358 (1983) to have a framework structure containing very large channels with a calculated free pore diameter of 14.2 Angstroms. R. Szostak et al., Zeolites: Facts, Figures, Future, Elsevier Science Publishers B.V., 1989, present work showing cacoxenite as being very hydrophilic, i.e., adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e., silicoaluminophosphates of particular structures are taught in U.S. Pat. Nos. 3,355,246 (i.e., ZK-21) and 3,791,964 (i.e., ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. 4,500,651.

The phosphorus-substituted zeolites of Canadian Patents 911,416: 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an aluminaaluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

SUMMARY OF THE INVENTION

The present invention is directed to a new synthetic composition of ultra-large pore crystalline material, e.g., [metallo]silicoaluminophosphate, having a composition, expressed on an anhydrous basis as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; $(a+b+c+d) = 1$; $a \geq 0$; b, c, and d are each $>0$; and h is a number of from 1 to 2.5.

The composition of the invention can be prepared by i) crystallizing a reaction mixture comprising sources of W, X, Z and an organic directing agent; ii) contacting the product of i) with a reaction mixture comprising sources of Y and organic directing agent; and iii) maintaining the mixture of ii) under conditions sufficient to form said composition of matter.

Yet another aspect of the invention relates to the use of the above composition for catalytic conversion of organic compounds.

DESCRIPTION OF SPECIFIC EMBODIMENTS

Figure 1:
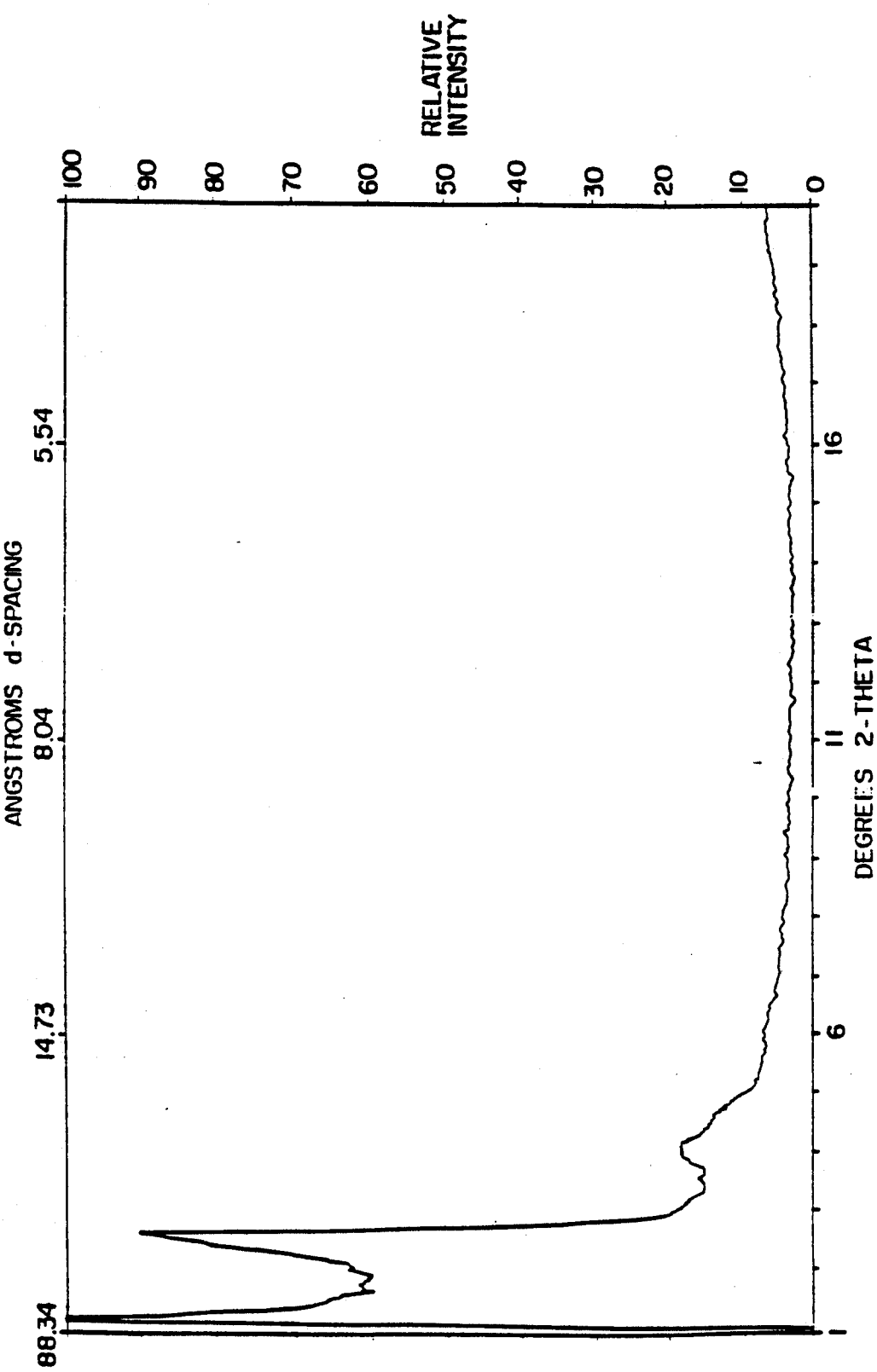
FIGS. 1–15 are X-ray diffraction patterns of products of Examples 1–14 and 16, respectively.

The present invention relates to a composition of matter comprising an inorganic, porous, non-layered crystalline phase material exhibiting, after calcination, an X-ray diffraction pattern with at least one peak at a d-spacing greater than about 18 Angstrom Units with a relative intensity of 100%, and having a benzene adsorption capacity of greater than 15 grams benzene per 100 grams of said material at 6.7 kPa (50 torr) and 25° C.

In a preferred embodiment, the invention relates to a composition of matter comprising an inorganic, porous crystalline phase material having a hexagonal arrangement of uniformly-sized pores at least 15 Angstrom Units in diameter and exhibiting, after calcination, a hexagonal electron diffraction pattern that can be indexed with a $d_{100}$ value greater than 18 Angstrom Units.

The pore sizes referred to herein are not strict crystallographic dimensions but instead are effective pore sizes determined by sorption measurement. The preferred method of determining pore size employs argon physisorption, which is a known technique and is described in detail in Examples 22(a) and 22(b). In this method the mass of argon adsorbed by a sample at constant temperature but varying relative pressure above the sample is measured and used to plot an adsorption isotherm. The point on the isotherm corresponding to a rapid change of gradient indicates pore filling and can be used to determine pore size by the known mathematical relationships described in Example 22.

The crystalline (i.e., meant here as having sufficient order to provide, after calcination, a diffraction pattern with at least one peak by, for example, X-ray, electron or neutron diffraction) material of this invention may be characterized by its heretofore unknown structure, including extremely large pore windows, and high sorption capacity. In general, the material of the invention is "mesoporous", by which is meant that the material has uniform pores of diameter within the range of 13 to 200 Angstrom Units, say, 15 to 200 Angstrom Units. More preferably, the materials of the invention have uniform pores of diameter within the range 18 to 100 Angstrom Units. In this respect, pore size is considered as the maximum perpendicular cross-sectional dimension of the pore.

The material of the present invention can be distinguished from other porous inorganic solids by the regularity of its large open pores, whose size more nearly resembles that of amorphous or paracrystalline materials, but whose regular arrangement and uniformity of size (pore size distribution within a single phase of, for example, ±25%, usually ±15% or less of the average pore size of that phase) more closely resemble those of crystalline framework materials such as zeolites.

In the preferred arrangement, the porosity of the crystalline material of the invention is provided by a generally hexagonal arrangement of open channels, a property that can be readily observed by electron diffraction and transmission electron microscopy. In particular, the transmission electron micrograph of properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $$d_{100} = a_0\sqrt{3}/2.$$

This $d_{100}$ spacing observed in the electron diffraction patterns corresponds to the d-spacing of a low angle peak in the X-ray diffraction pattern of the material. The most highly ordered preparations of the material obtained so far have 20-40 distinct spots observable in the electron diffraction patterns. These patterns can be indexed with the hexagonal hk0 subset of unique reflections of 100, 110, 200, 210, etc., and their symmetry-related reflections.

In this respect, it is to be understood that the reference to a hexagonal arrangement of channels is intended to encompass not only mathematically perfect hexagonal symmetry but also an arrangement in which most channels in the material are surrounded by six nearest neighbor channels at substantially the same distance. Defects and imperfections will cause significant numbers of channels to violate this criterion to varying degrees. Samples which exhibit as much as ±25% random deviation from the average repeat distance between adjacent channels still clearly give recognizable images of the present ultra-large pore materials.

The most regular preparations of the preferred material of the invention give a hexagonal X-ray diffraction pattern with a few distinct maxima in the extreme low angle region. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material of the invention.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material.

More preferably, the calcined crystalline material of the invention is characterized by an X-ray diffraction pattern with at least two peaks at positions greater than about 10 Angstrom Units d-spacing (8.842 degrees two-theta for Cu K-alpha radiation), at least one of which is at a position greater than 18 Angstrom Units d-spacing, and no peaks at positions less than 10 Angstrom Units d-spacing with relative intensity greater than about 20% of the strongest peak. Still more particularly, the X-ray diffraction pattern of the calcined material of this invention has no peaks at positions less than 10 Angstrom Units d-spacing with relative intensity greater than about 10% of the strongest peak. In the preferred hexagonal arrangement, at least one peak in the X-ray pattern will have a d-spacing corresponding to the $d_{100}$ value of the electron diffraction pattern of the material.

X-ray diffraction data referred to herein were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom Units, and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75-100), s=strong (50-74), m=medium (25-49) and w=weak (0-24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The material of the invention exhibits an equilibrium benzene adsorption capacity of greater than about 15 grams benzene/100 grams crystal at 6.7 kPa (50 torr) and 25° C. The equilibrium benzene adsorption capacity must, of course, be measured on a sample which exhibits no pore blockage by incidental contaminants For example, water should be removed by dehydration techniques, e.g., thermal treatment, whereas inorganic amorphous materials, e.g., silica, and organics should be removed by contact with acid or base or other chemical agents and/or physical methods (such as, calcination) so that the detrital material is removed without detrimental effect on the material of the invention.

In general, the crystalline material of this invention has a composition, expressed on an anhydrous basis as follows:

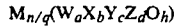

$$M_{n/q}(W_aX_bY_cZ_dO_h)$$

wherein M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; W is one or more divalent elements, such as a divalent first row transition metal, e.g., manganese, cobalt, nickel, iron, and/or magnesium, preferably cobalt; X is one or more trivalent elements, such as aluminum, boron, chromium, iron and/or gallium, preferably aluminum; Y is one or more tetravalent elements, such as silicon and/or germanium, preferably silicon; Z is one or more pentavalent elements, such as phosphorus and/or arsenic, preferably phosphorus; a, b, c, and d are mole fractions of W, X, Y, and Z, respectively; $(a+b+c+d)=1$; $a \geq 0$; b, c, and d are each $\geq 0$: and h is a number of from 1 to 2.5. In a preferred embodiment, $a=0$ and $h=2$.

In the as-synthesized form, the material of this invention has a composition, on an anhydrous basis, expressed empirically as follows:

$$rR_tM_{n/q}(W_aX_bY_cZ_dO_h)$$

wherein $R_t$ is the total organic material used to assist in the synthesis of the material and not included in M as an ion, and r is the coefficient for $R_t$, i.e., the number of moles or mole fraction of $R_t$.

The M and $R_t$ components are associated with the material as a result of their presence during crystallization, and are easily removed or, in the case of M, replaced by post-crystallization methods hereinafter more particularly described. For example, the original M, e.g., sodium or chloride, ions of the as-synthesized material of this invention can be replaced by ion exchange with other ions. Preferred replacing ions include metal ions, hydrogen ions, hydrogen precursor, e.g., ammonium, ions and mixtures thereof. Particularly preferred ions are those which tailor the catalytic activity for certain hydrocarbon conversion reactions. These include hydrogen, rare earth metals and metals of Groups IA (e.g., K), IIA (e.g., Ca), VIIA (e.g., Mn), VIIIA (e.g., Ni), IB (e.g., Cu), IIB (e.g., Zn), IIIB (e.g., In), IVB (e.g., Sn), and VIIB (e.g., F) of the Periodic Table of the Elements (Sargent-Welch Scientific Co. Cat. No. S-18806, 1979) and mixtures thereof.

The present invention further relates to a method for preparing the above composition of matter which comprises:

i) crystallizing a first reaction mixture having a composition in terms of mole ratios of oxides, within the following ranges:

| Reactants | Useful | Preferred | More Preferred |
|---|---|---|---|
| $WO/X_2O_3$ | 0 to 0.5 | 0 to 0.3 | 0 to 0.25 |
| $Z_2O_5/X_2O_3$ | 0.5 to 5 | 0.6 to 2 | 0.8 to 1.2 |
| $(WO + X_2O_3)/Z_2O_5$ | 0.2 to 3 | 0.4 to 2 | 0.8 to 1.2 |
| Solvent/ $(WO + X_2O_3 + Z_2O_5)$ | 4 to 500 | 10 to 400 | 10 to 200 |
| $(M_{2/e}O + R_{2/f}O + R'_{2/g}O)/$ $(WO + X_2O_3 + Z_2O_5)$ | 0.05 to 5 | 0.1 to 3 | 0.15 to 3 |
| $R'_{2/g}O/R_{2/f}O$ | $\geq 0$ | $\geq 0$ | $\geq 0$ | wherein M, W, X, Y and Z are as described above, e, f and g are the weighted average valences of M, R and R', respectively, wherein the solvent is a $C_1$ to $C_6$ alcohol or diol, or water, especially water, R comprises an organic directing agent selected from the group consisting of aromatic amines, cyclic aliphatic amines and polycyclic aliphatic amines, especially aromatic amines, e.g., pyrrolidine, and R' comprises an organic directing agent having the formula $R_1R_2R_3R_4Q^+$, wherein Q is nitrogen or phosphorus and at least one of $R_1$, $R_2$, $R_3$ and $R_4$ is aryl or alkyl group having 6 to 36 carbon atoms and each of the remainder of $R_1$, $R_2$, $R_3$ and $R_4$ is selected from hydrogen and an alkyl group having 1 to 5 carbon atoms;

ii) contacting the crystallized product of i) with a second reaction mixture having a composition in terms of mole ratios of oxides, within the following ranges:

| | Useful | Preferred | More Preferred |
|---|---|---|---|
| $R'_{2/g}O/YO_2$ | 0.05 to 2 | 0.1 to 1.5 | 0.3 to 1 |
| Solvent/$YO_2$ | 20 to 1000 | 30 to 500 | 30 to 400 | wherein the product of i) is added to provide a mixture having 0.1 to 2 moles of $X_2O_3$ per mole of $YO_2$ in the reaction mixture; and iii) maintaining the product of ii) under conditions sufficient to form said composition of matter.

The crystallizing conditions of step i) include a temperature of 25° to 250° C. for 6 to 200 hours, preferably a temperature of 100° to 200° C. for 6 to 100 hours.

The conditions of step iii) can include a temperature of 25° to 150° C. for 2 to 96 hours, preferably, a temperature of 50° to 150° C. for 4 to 48 hours.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400.C for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

Batch crystallization of the present crystalline material can be carried out under either static or agitated, e.g., stirred, conditions in a suitable reactor vessel, such as for example, polypropylene jars or Teflon lined or stainless steel autoclaves. Crystallization may also be conducted continuously in suitable equipment. The total useful range of temperatures for crystallization is noted above for each method for a time sufficient for crystallization to occur at the temperature used, e.g., from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

The particular effectiveness of the presently required directing agent(s) R and R', when compared with other such agents known to direct synthesis of one or more other crystal structures, is believed due to their ability to function as a template in the above reaction mixture in the nucleation and growth of the desired ultra-large pore crystals with the limitations discussed above.

The organic directing agent R is selected from the group consisting of (1) aromatic amines, cyclic aliphatic amines and polycyclic aliphatic amines, preferably aromatic amines such as $C_4$ to $C_{20}$ aromatic amines, e.g., pyrrolidine.

The organic directing agent R' for use in the above method for synthesizing the present material from the reaction mixture is an ammonium or phosphonium ion of the formula $R_1R_2R_3R_4Q^+$, i.e.:

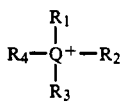

wherein Q is nitrogen or phosphorus and wherein at least one of $R_1$, $R_2$, $R_3$ and $R_4$ is aryl or alkyl of from 8 to about 36 carbon atoms, e.g., $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. Non-limiting examples of these directing agents include cetyltrimethylammonium, cetyltrimethylphosphonium, octadecyltrimethylphosphonium, cetylpyridinium, myristyltrimethylammonium, decyltrimethylammonium, dodecyltrimethylammonium and dimethyldidodecylammonium. The compound from which the above ammonium or phosphonium ion is derived may be, for example, the hydroxide, halide, silicate, or mixtures thereof. It has been found that products of differing X-ray diffraction patterns can be obtained, e.g., by substituting an onium chloride for an onium hydroxide in the mixture of step i).

In a preferred embodiment R' comprises 50 to 99 weight percent of an additional organic directing agent having the same formula as the first-mentioned organic directing agent but wherein each of $R_1$, $R_2$, $R_3$ and $R_4$ is selected from hydrogen and an alkyl group of 1 to 5 carbon atoms.

Any combination of the above organic directing agents R and R' go to make up "$R_t$" and will be in R/R' molar ratio of about 100/1 to about 0.01/1.

It should be realized that the reaction mixture components can be supplied by more than one source. The reaction mixtures can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions can be useful as catalyst components for catalyzing the conversion of organic compounds, e.g., oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications", 36 CHEMICAL INDUSTRIES, pgs. 41–61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g., molecular sizes of about 13 Angstroms or more. The present catalytic compositions are particularly useful for reactions in which the molecular weight of the feed is reduced to a lower value, i.e., to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 $hr^{-1}$ to about 100 $hr^{-1}$, with a hydrogen/hydrocarbon molar ratio of from about 0.1 to about 100.

The catalytic compositions of matter according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The porous crystalline material may be used in a matrixed or unmatrixed form for this purpose and may suitably be formed into extrudates, pellets or other shapes to permit the passage of gases over the catalyst with the minimum pressure drop. The crystalline material is preferably at least partly in the hydrogen form, but it may advantageously contain a minor amount of a noble metal as a catalytic component, especially a metal of Periods 5 and 6 of Group VIIIA of the Periodic Table, especially platinum, palladium, ruthenium, rhodium, iridium or mixtures thereof. Amounts of noble metal up to about 1 weight percent are typical with lower amounts, e.g., up to about 0.1 or 0.5 weight percent being preferred.

The $NO_x$ reduction is suitably conducted by passing the gas containing the oxides of nitrogen over the catalyst at an elevated temperature, typically at least 200° C., and usually within the range of 200° to 600° C. The gas mixture may be mixed with ammonia to promote reduction of the oxides of nitrogen and pre-mixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

$$6NO_2 + 8NH_3 = 7N_2 + 12H_2O$$

$$6NO + 4NH_3 = 5N_2 + 6H_2O$$

The crystalline catalytic compositions of matter may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the present catalytic compositions have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g., USY.

The present catalytic compositions are especially useful for reactions using high molecular weight, high boiling or non-distillable feeds, especially residual feeds, i.e., feeds which are essentially non-distillable or feeds which have an initial boiling point (5% point) above about 1050° F. Residual feeds which may be used with the present catalytic compositions include feeds with API gravities below about 20, usually below 15 and typically from 5 to 10 with Conradson Carbon Contents (CCR) of at least 1% by weight and more usually at least 5% or more, e.g., 5–10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g., phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials.

The compositions of this invention can also be used as adsorbents and separation vehicles in pharmaceutical and fine chemical applications. For example, these ultra-large pore compositions may be used in the purification of drugs like insulin or be used as solid vehicles for the controlled delivery of drugs. Another application for use of these ultra-large pore materials involves waste disposal where the extraordinary pore volumes are exploited. Therefore, at least one component can be partially or substantially totally separated from a mixture of components having differential sorption characteristics with respect to the present ultra-large pore composition by contacting the mixture with the composition to selectively sorb the one component. Examples of this include contacting a mixture comprising water and at least one hydrocarbon component, whereby the at least one hydrocarbon component is selectively sorbed. Another example includes selective sorption of at least one hydrocarbon component from a mixture comprising same and at least one additional hydrocarbon component.

As in the case of many catalysts, it may be desired to incorporate the new crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst component(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50° Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g., containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

Examples 1 to 4 and 6 to 23 relate to mesoporous crystalline materials and their analysis, in general. Examples 5 and 24 to 26 relate specifically to the subject matter of the present invention. In the examples metric units and parts by weight are employed unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

| |
|---|
| 2.7 moles $Na_2O$ |
| 392 moles $SiO_2$ |
| 35.7 moles $(CTMA)_2O$ |
| 61.7 moles $(TMA)_2O$ |
| 6231 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 475 m²/g and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The X-ray diffraction pattern of the calcined product of this example is shown in FIG. 1. In this and the following Figures, it is noted that 10 Angstrom Units d-spacing corresponds to 8.842 degrees 2-theta (Cu K-alpha radiation) and 18 Angstrom Units corresponds to 4.909 degrees.

The product of this example may be characterized as including a very strong relative intensity line at 37.8±2.0 Angstroms d-spacing, and weak lines at 21.6±1.0 and 19.2±1.0 Angstroms. The present ultra-large pore material was demonstrated to be in the product of this example by transmission electron microscopy (TEM), which produced images of a hexagonal arrangement of uniform pores and hexagonal electron diffraction pattern with a $d_{100}$ value of about 39 Angstroms.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five gram of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

| | |
|---|---|
| 2.7 | moles $Na_2O$ |
| 291 | moles $SiO_2$ |
| 35.7 | moles $(CTMA)_2O$ |
| 102 | moles $(TMA)_2O$ |
| 6120 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

Figure 2:
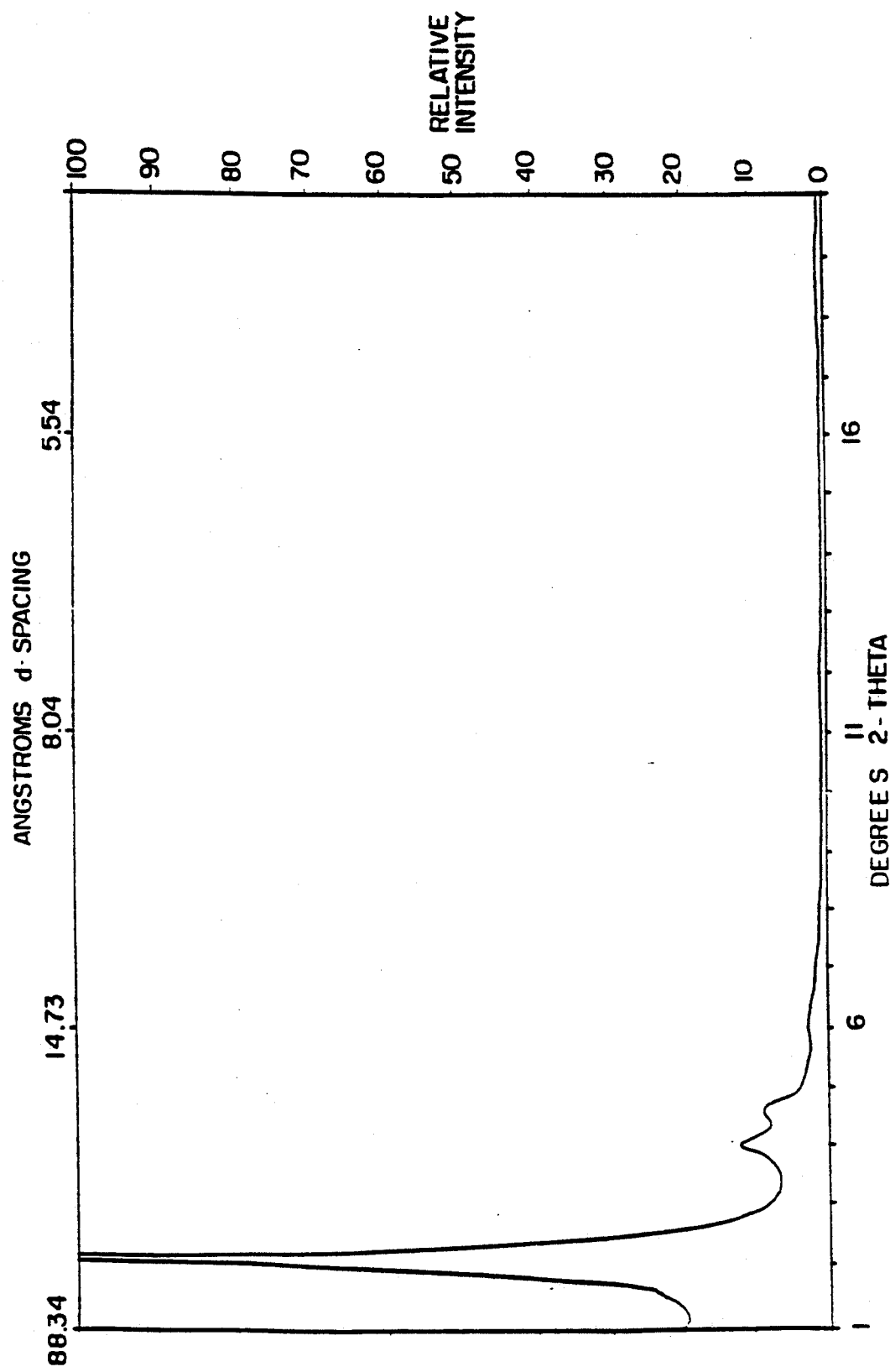

The X-ray diffraction pattern of the calcined product of this example is shown in FIG. 2. It may be characterized as including a very strong relative intensity line at 39.3±2.0 Angstroms d-spacing, and weak lines at 22.2±1.0 and 19.4±1.0 Angstroms. TEM indicated that the product contained the present ultra-large pore material.

A portion of the above product was then contacted with 100% steam at 1450° F. for two hours. The surface area of the steamed material was measured to be 440 $m^2/g$, indicating that about 45% was retained following severe steaming.

Another portion of the calcined product of this example was contacted with 100% steam at 1250° F. for two hours. The surface area of this material was measured to be 718 $m^2/g$, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

| | |
|---|---|
| 0.65 | moles $Na_2O$ |
| 65 | moles $SiO_2$ |
| 8.8 | moles $(CTMA)_2O$ |
| 1.22 | moles $(TPA)_2O$ |
| 1336 | moles $H_2O$ |

The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

| | |
|---|---|
| 0.65 | moles $Na_2O$ |
| 65 | moles $SiO_2$ |
| 15 | moles $(CTMA)_2O$ |
| 1.22 | moles $(TPA)_2O$ |
| 35.6 | moles $(TMA)_2O$ |
| 2927 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 1085 $m^2/g$ and the following equilibrium adsorption capacities in grams/100 grams:

| | |
|---|---|
| $H_2O$ | 11.5 |
| Cyclohexane | >50 |
| n-Hexane | 39.8 |
| Benzene | 62 |

Figure 3:
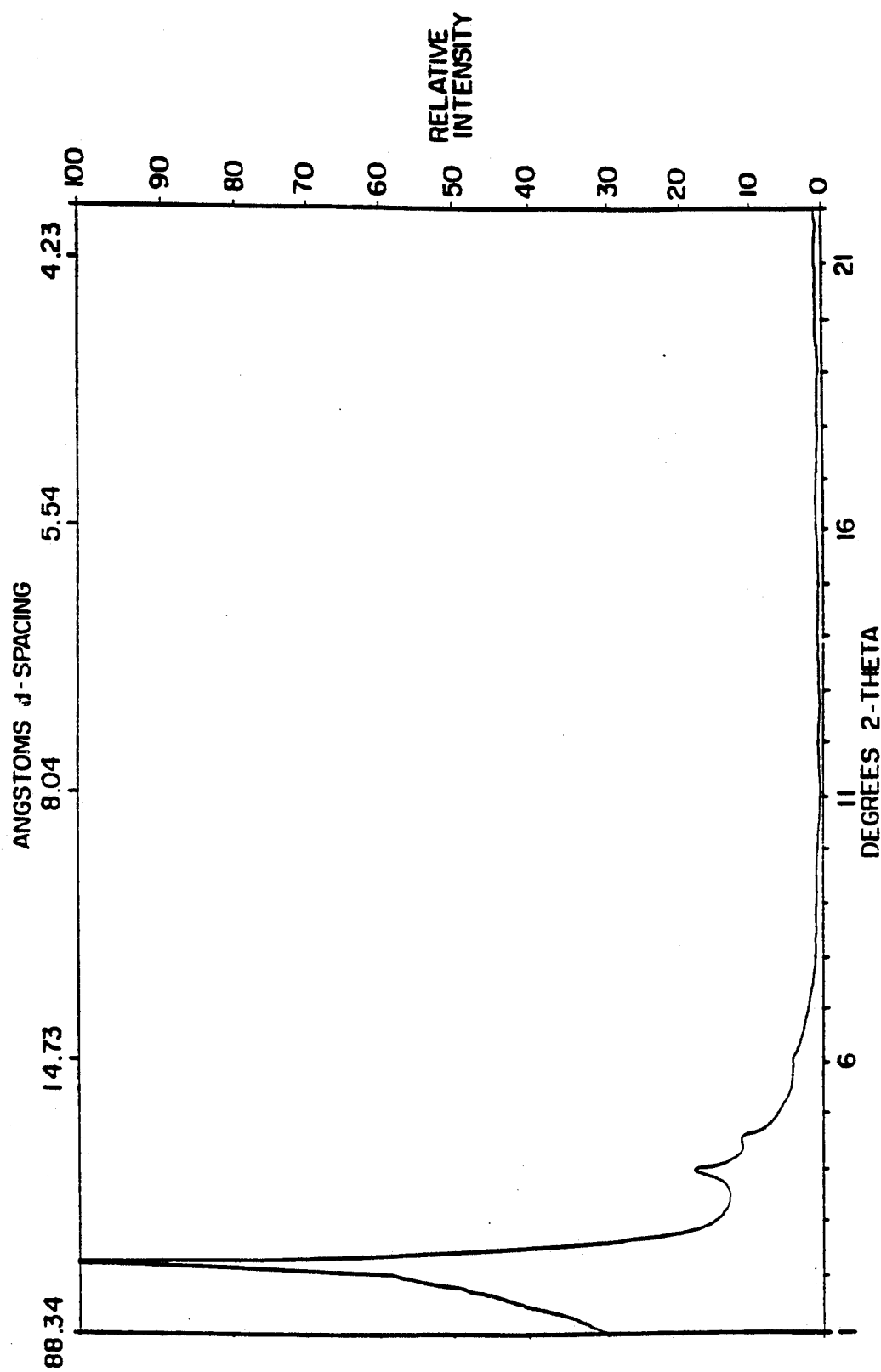

The X-ray diffraction pattern of the calcined product of this example is shown in FIG. 3. The product of this example may be characterized as including a very strong relative intensity line at 38.2±2.0 Angstroms d-spacing, and weak lines at 22.2±1.0 and 19.4±1.0 Angstroms. TEM indicated the product contained the present ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

| | |
|---|---|
| 0.23 | moles $Na_2O$ |
| 33.2 | moles $SiO_2$ |
| 6.1 | moles $(CTMA)_2O$ |
| 5.2 | moles $(TMA)_2O$ |
| 780 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 1043 m²/g and the following equilibrium adsorption capacities in grams/100 grams:

|  |  |
|---|---|
| H₂O | 6.3 |
| Cyclohexane | >50 |
| n-Hexane | 49.1 |
| Benzene | 66.7 |

Figure 4:
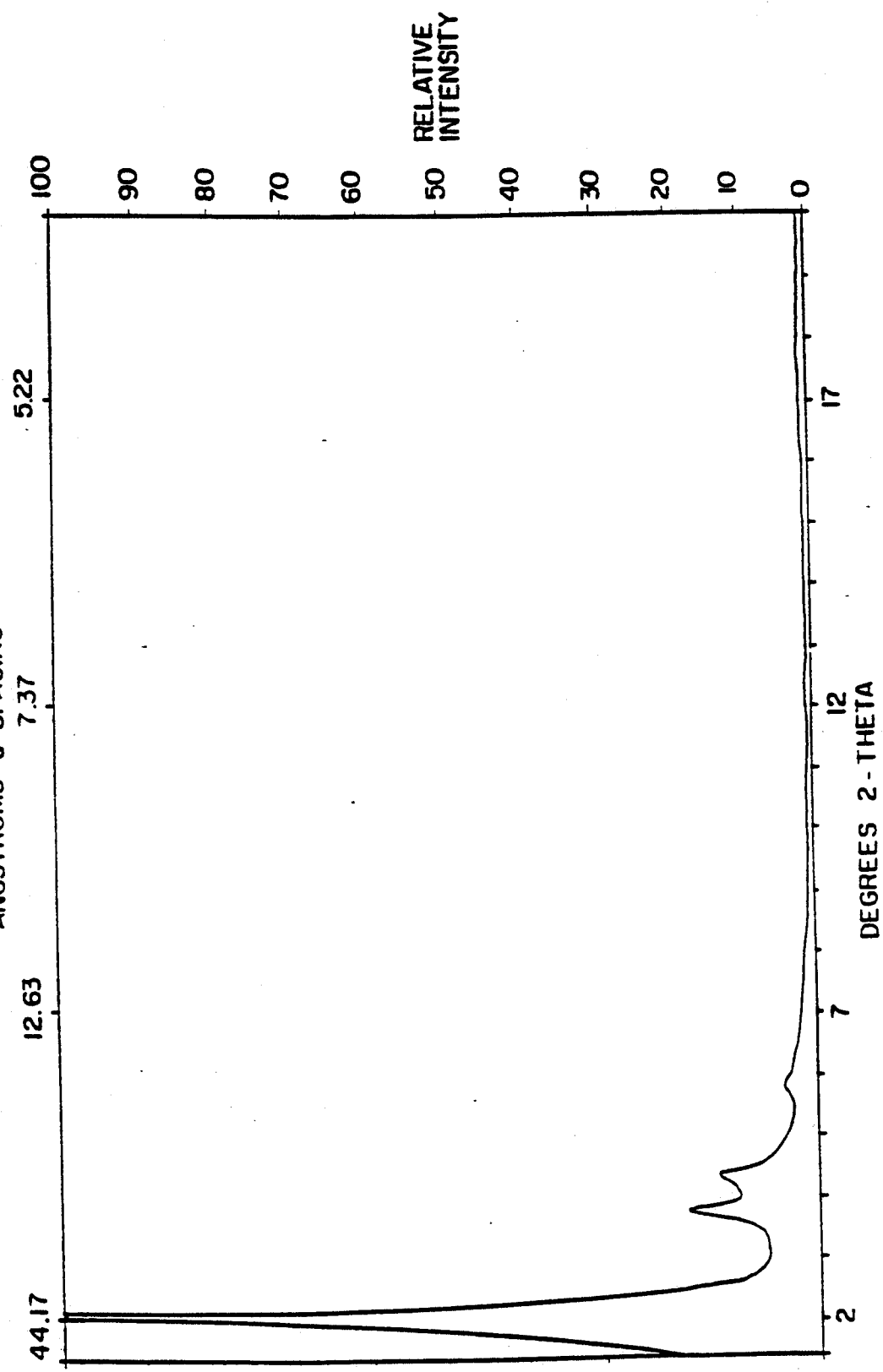

The X-ray diffraction pattern of the calcined product of this example is shown in FIG. 4. It may be characterized as including a very strong relative intensity line at 40.8±2.0 Angstroms d-spacing, and weak lines at 23.1±1.0 and 20.1±1.0 1.0 Angstroms. TEM indicated that the product contained the present ultra-large pore material (see Example 23).

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole Al₂O₃.

|  |
|---|
| 1.0 moles P₂O₅ |
| 0.51 moles (Pyr)₂O |
| 47.2 moles H₂O |

The resulting solid product was recovered by filtration and dried in air at ambient temperature. The product was then calcined at 540° C. for 1 hour in nitrogen, followed by 6 hours in air.

The calcined product proved to have a surface area of 707 m²/g and the following equilibrium adsorption capacities in grams/100 grams:

|  |  |
|---|---|
| H₂O | 33.2 |
| Cyclohexane | 19.7 |
| n-Hexane | 20.1 |
| Benzene | 23.3 |

Figure 5:
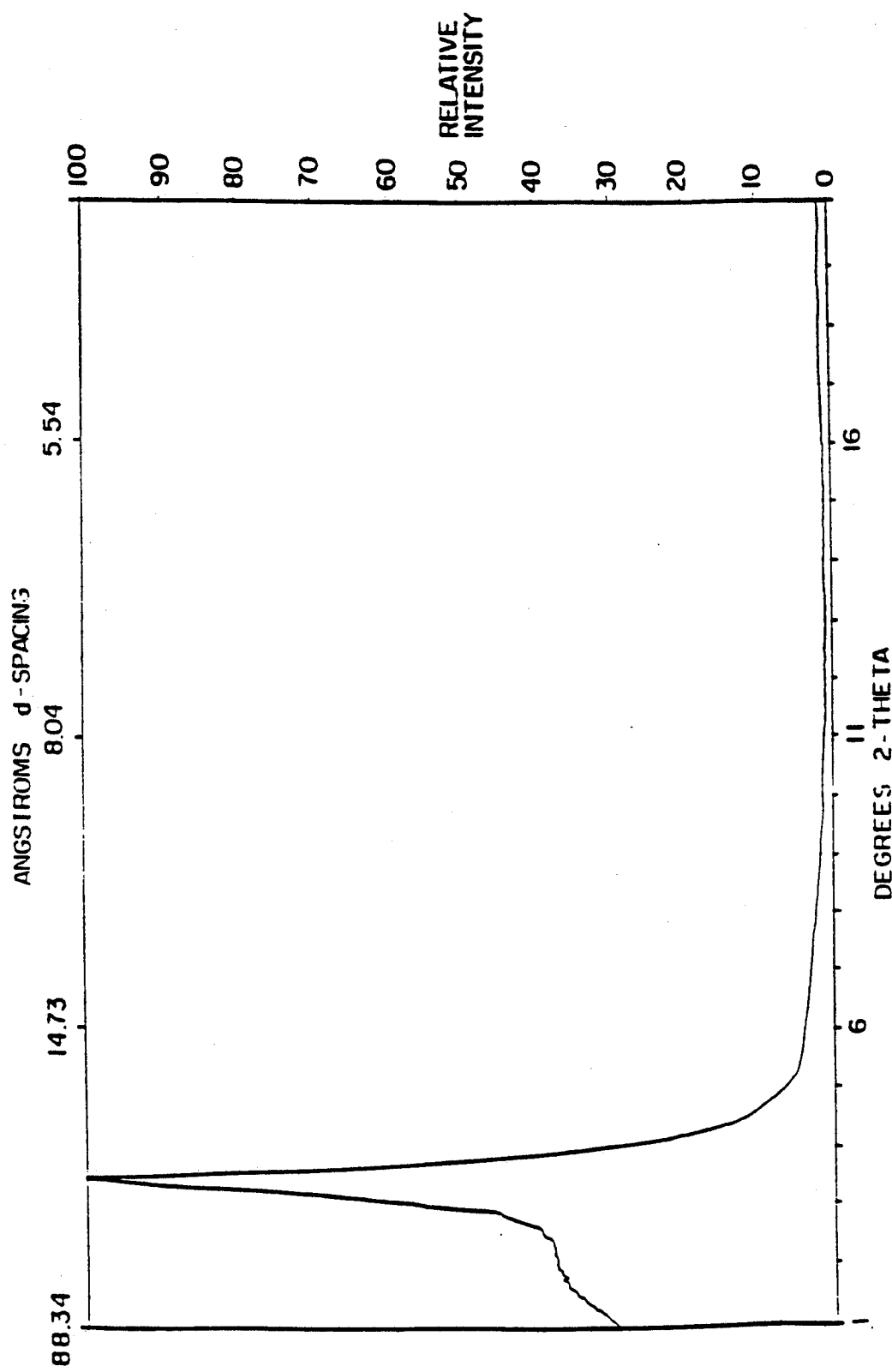

The X-ray diffraction pattern of the calcined product of this example is shown in FIG. 5. It may be characterized as including a very strong relative intensity line at 25.4±1.5 Angstroms d-spacing. TEM indicated the product contained the present ultra-large pore material (see Example 23).

EXAMPLE 6

A solution of 1.35 grams of NaAlO₂ (43.5% Al₂O₃, 30% Na₂O) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

|  |
|---|
| 0.25 moles Al₂O₃ |
| 10 moles Na₂O |
| 36 moles SiO₂ |
| 0.95 moles (CTMA)₂O |
| 2.5 moles (TEA)₂O |
| 445 moles H₂O |

The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % SiO₂ and 5.1 wt. % Al₂O₃, and proved to have a benzene equilibrium adsorption capacity of 58.6 grams/100 grams.

Figure 6:
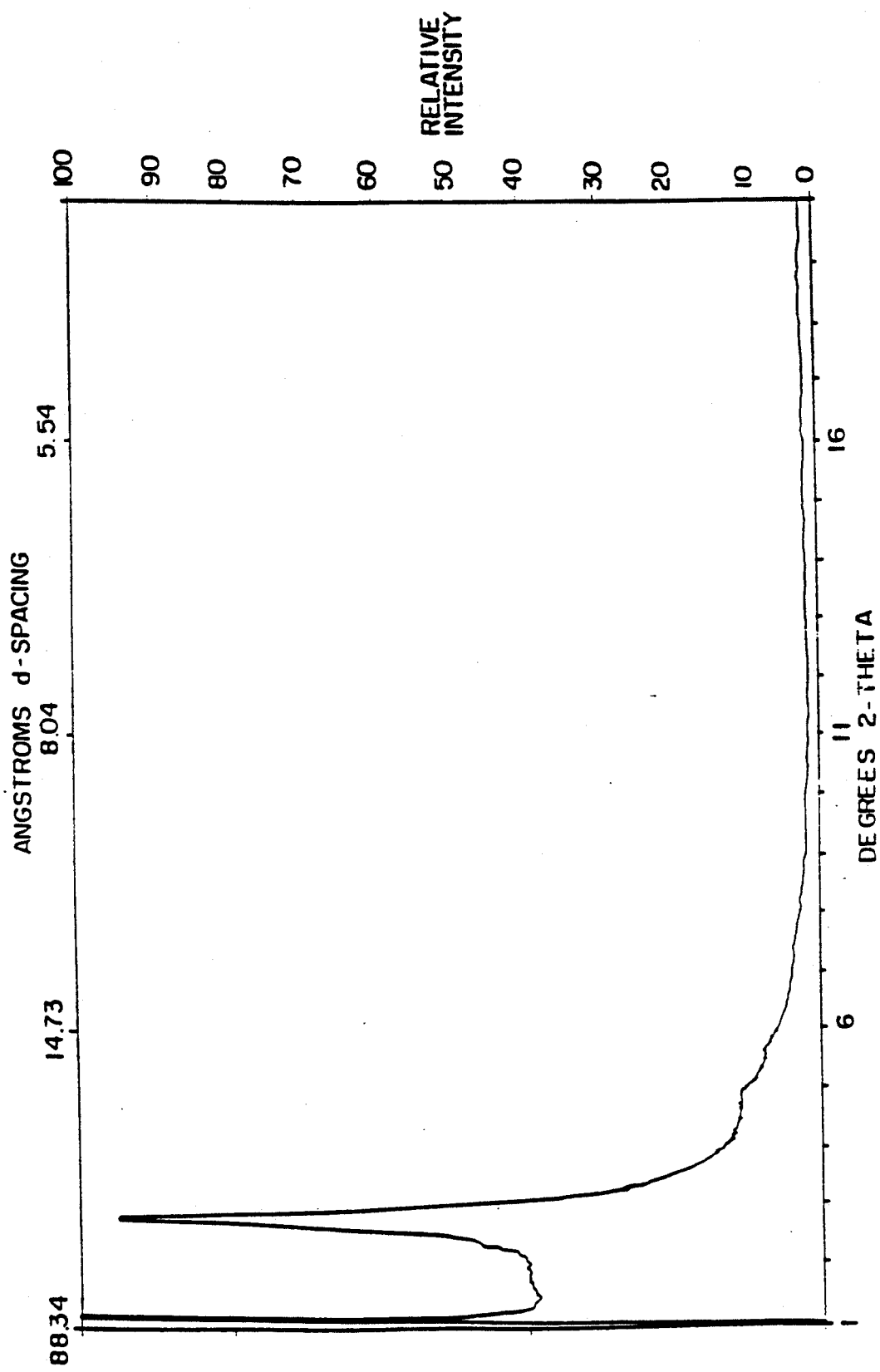

The X-ray diffraction pattern of the calcined product of this example is shown in FIG. 6. The product of this example may be characterized as including a very strong relative intensity line at 31.4±1.5 Angstroms d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole SiO₂:

|  |
|---|
| 0.5 mole (CTMA)₂O |
| 46.5 moles H₂O |

The resulting solid product was recovered by filtration, washed with water, then calcined at 540° C. for 1 hour in nitrogen, followed by 10 hours in air.

The calcined product composition included less than 0.01 wt. % Na, about 98.7 wt. % SiO₂ and about 0.01 wt. % Al₂O₃, and proved to have a surface area of 896 m²/g. The calcined product had the following equilibrium adsorption capacities in grams/100 grams:

|  |  |
|---|---|
| H₂O | 8.4 |
| Cyclohexane | 49.8 |
| n-Hexane | 42.3 |
| Benzene | 55.7 |

Figure 7:
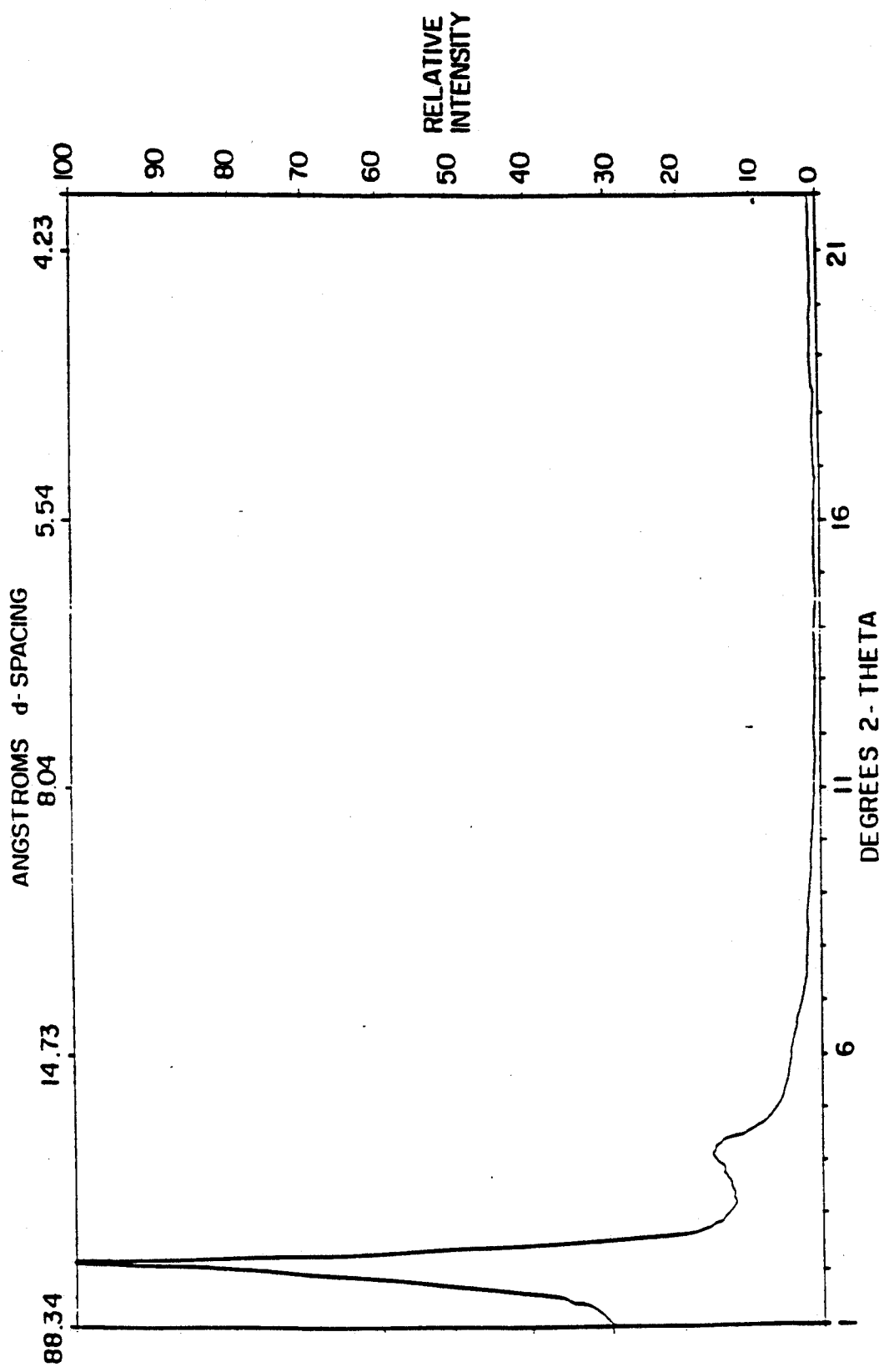

The X-ray diffraction pattern of the calcined product of this example is shown in FIG. 7. It may be characterized as including a very strong relative intensity line at 40.0±2.0 Angstroms d-spacing and a weak line at 21.2±1.0 Angstroms. TEM indicated that the product of this example contained at least three separate phases, one of which was the present ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm.

The mixture had a composition in terms of moles per mole $SiO_2$:

| | |
|---|---|
| 0.5 mole $(CTMA)_2O$ | |
| 46.5 moles $H_2O$ | |

The resulting solid product was recovered by filtration, washed with water, then calcined at 540° C. for 6 hours in air. The calcined product composition was measured to include 0.01 wt. % Na, 93.2 wt. % $SiO_2$ and 0.016 wt. % $Al_2O_3$, and proved to have a surface area of 992 $m^2/g$ and the following equilibrium adsorption capacities in grams/100 grams:

| | |
|---|---|
| $H_2O$ | 4.6 |
| Cyclohexane | >50 |
| n-Hexane | >50 |
| Benzene | 62.7 |

Figure 8:
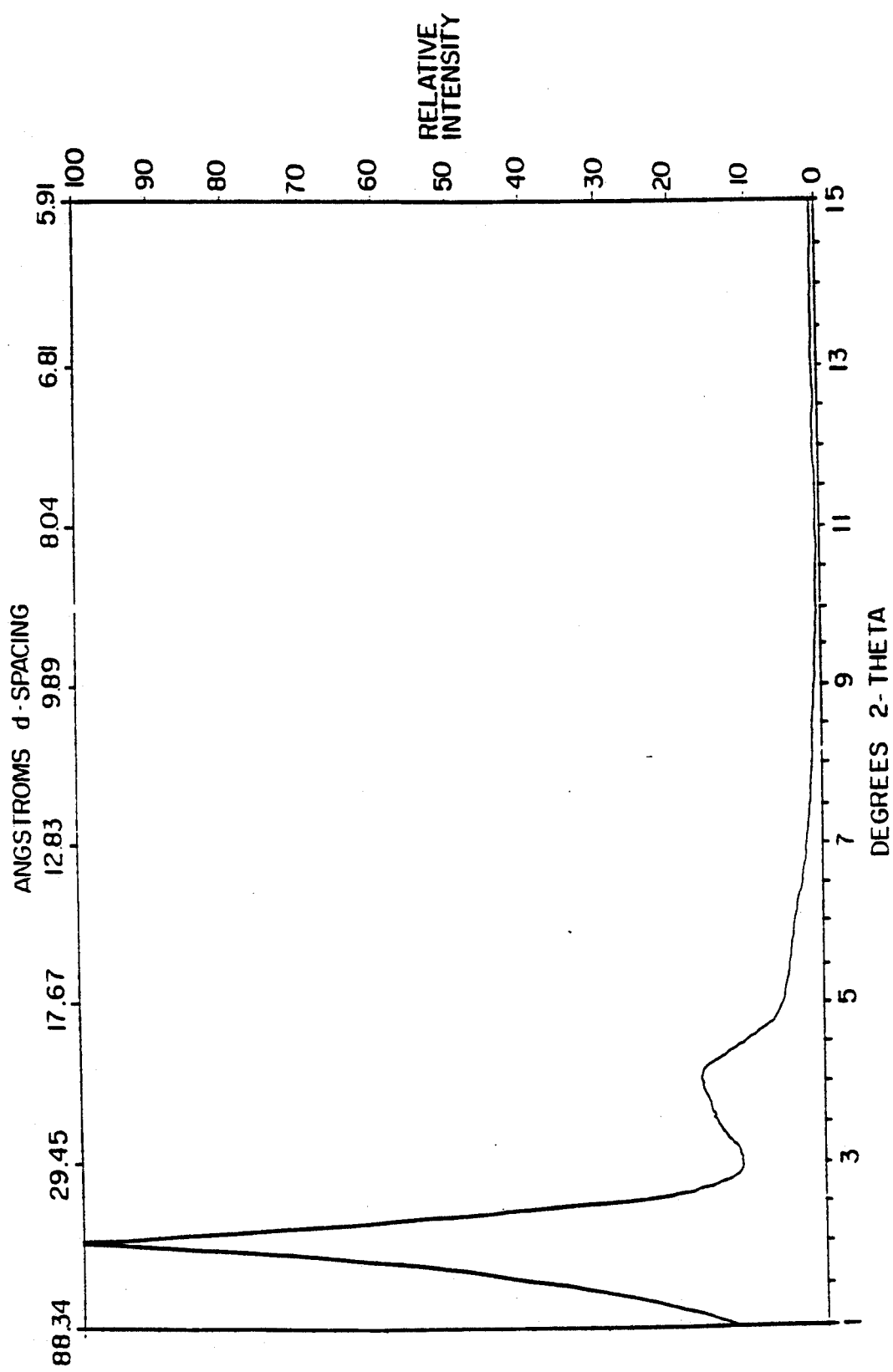

The X-ray diffraction pattern of the calcined product of this example is shown in FIG. 8. This product may be characterized as including a very strong relative intensity line at 43.6±2.0 Angstroms d-spacing and weak lines at 25.1±1.5 and 21.7±1.0 Angstroms. TEM indicated that the product contained the present ultra-large pore material.

EXAMPLE 9

Sodium aluminate (4.15g) was added slowly into a solution containing 16g of myristyltrimethylammonium bromide ($C_{14}$TMABr) in 100g of water. Tetramethylammonium silicate (100g-10% $SiO_2$), HiSil (25g) and tetramethylammonium hydroxide (14.2g-25% solution) were then added to the mixture. The mixture was crystallized in an autoclave at 120° C. with stirring for 24 hours.

Figure 9:
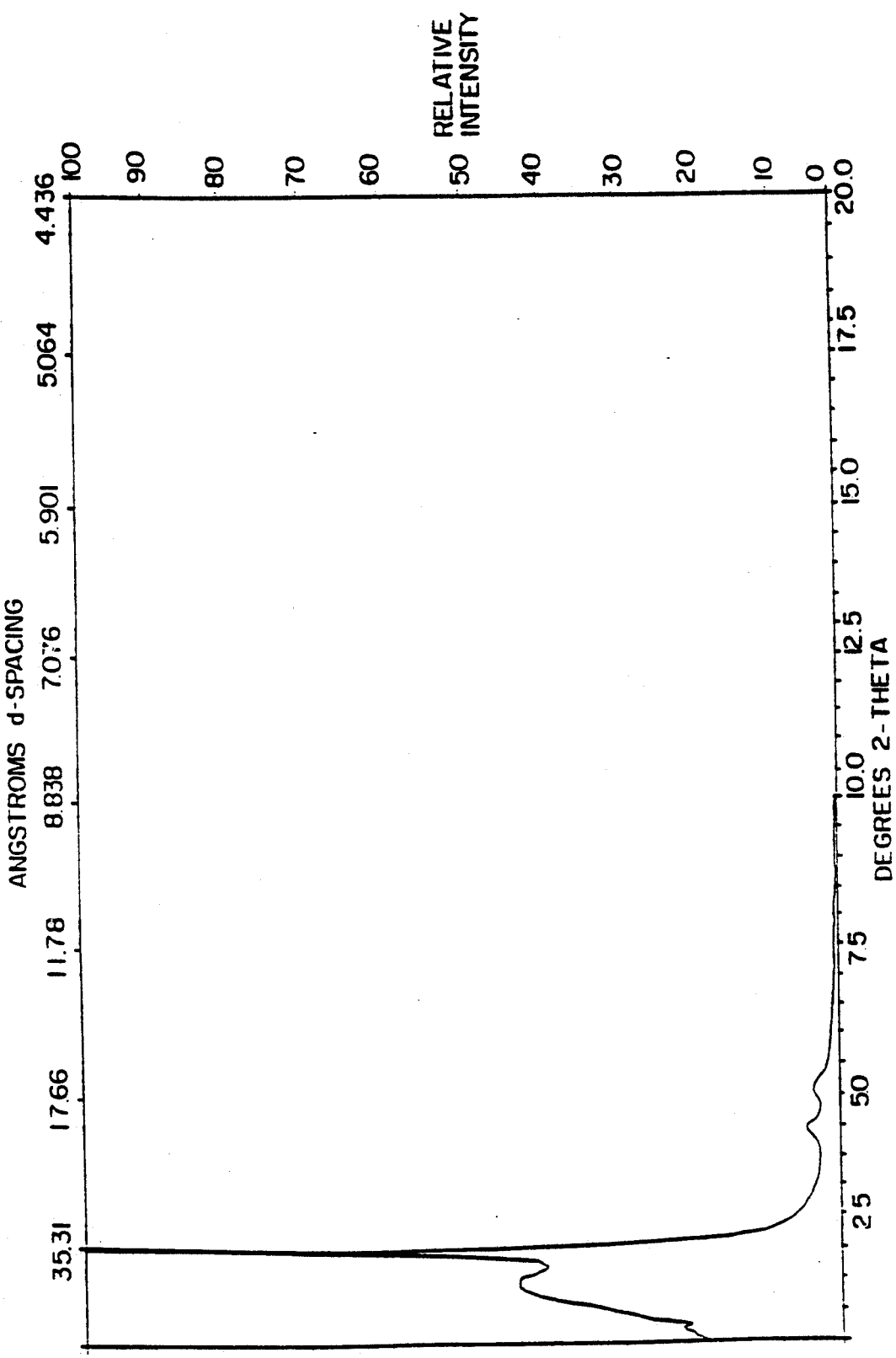

The product was filtered, washed and air dried. Elemental analysis showed the product contained 53.3 wt. % $SiO_2$, 3.2 wt. % $Al_2O_3$, 15.0 wt. % C, 1.88 wt. % N, 0.11 wt. % Na and 53.5 wt. % ash at 1000° C. FIG. 9 shows the X-ray diffraction pattern of the material having been calcined at 540° C. for 1 hour in $N_2$ and 6 hours in air. The X-ray diffraction pattern includes a very strong relative intensity line at 35.3±2.0 Angstroms d-spacing and weak lines at 20.4±1.0 and 17.7±1.0 Angstroms d-spacing. TEM indicated that the product contained the present ultra-large pore material.

The washed product, having been exchanged with 1N ammonium nitrate solution at room temperature, then calcined, proved to have a surface area of 827 $m^2/g$ and the following equilibrium adsorption capacities in g/100g anhydrous sorbent:

| | |
|---|---|
| $H_2O$ | 30.8 |
| Cyclohexane | 33.0 |
| n-Hexane | 27.9 |
| Benzene | 40.7 |

EXAMPLE 10

Sodium aluminate (8.3g) was added slowly into a solution containing 184g of dodecyltrimethylammonium hydroxide ($C_{12}$TMAOH, 50%) solution diluted with 480g of water. UltraSil (50g) and an aqueous solution of tetramethylammonium silicate (200g-10% $SiO_2$) and tetramethylammonium hydroxide (26.38g-25% solution) were then added to the mixture. The mixture was crystallized in an autoclave at 100° C. with stirring for 24 hours.

Figure 10:
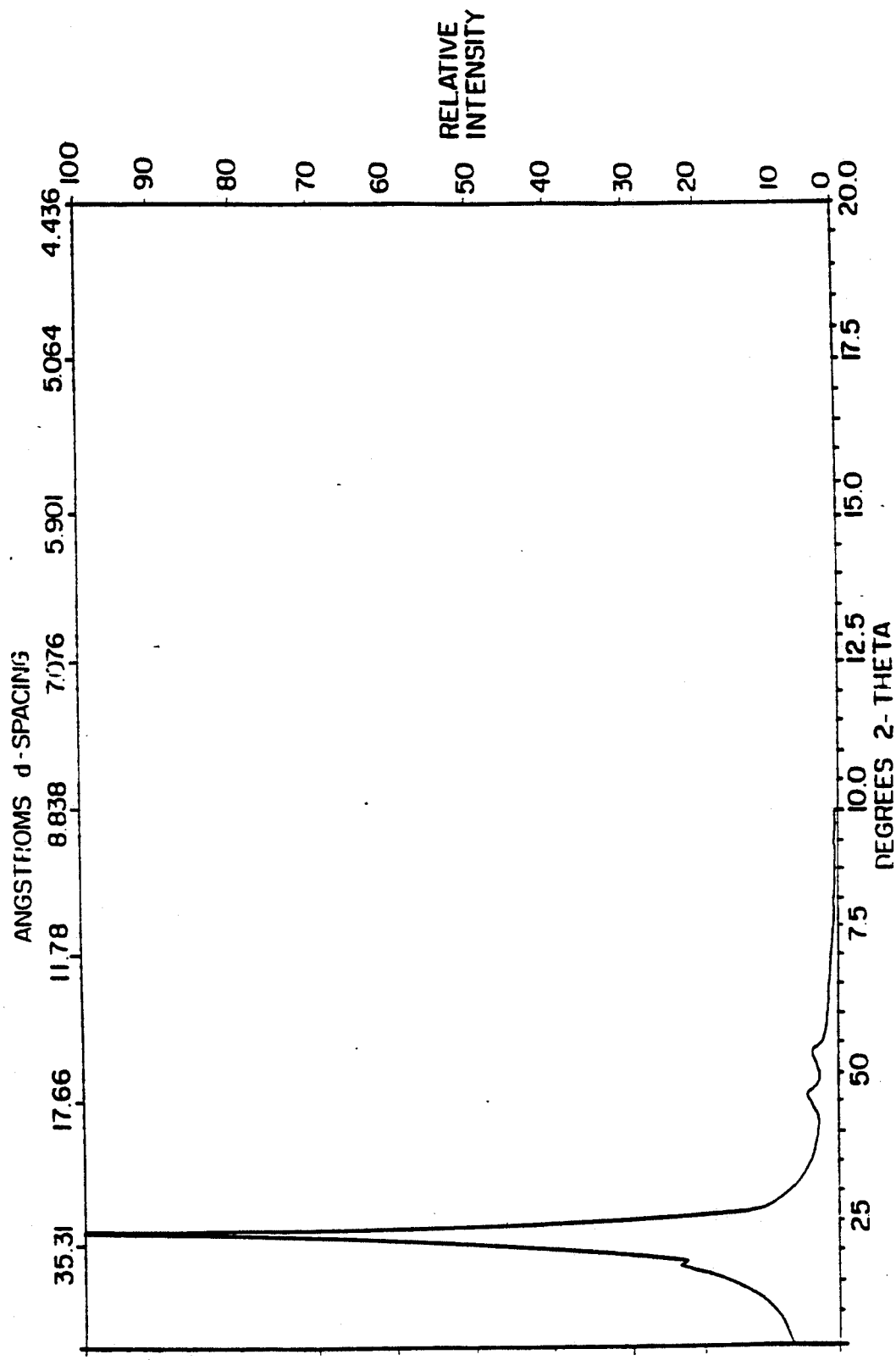

The product was filtered, washed and air dried. FIG. 10 shows the X-ray diffraction pattern of the material having been calcined at 540° C. for 1 hour in $N_2$ and 6 hours in air. The X-ray diffraction pattern includes a very strong relative intensity line at 30.4±1.5 Angstroms d-spacing and weak lines at 17.7±1.0 and 15.3±1.0 Angstroms d-spacing. TEM indicated that the product contained the present ultra-large pore material.

The washed product, having been exchanged with 1N ammonium nitrate solution at room temperature, then calcined, proved to have a surface area of 1078 $m^2/g$ and the following equilibrium adsorption capacities in g/100g anhydrous sorbent:

| | |
|---|---|
| $H_2O$ | 32.6 |
| Cyclohexane | 38.1 |
| n-Hexane | 33.3 |
| Benzene | 42.9 |

EXAMPLE 11

A solution of 4.9 grams of $NaAO_2$ (43.5% $Al_2O_3$, 30% $NaO_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole $Al_2O_3$:

| | |
|---|---|
| 1.1 moles $Na_2O$ | |
| 30.6 moles $SiO_2$ | |
| 3.0 moles $(TEA)_2O$ | |
| 3.25 moles $(CTMA)_2O$ | |
| 609 moles $H_2O$ | |

The resulting solid product was recovered by filtration, washed with water then calcined at 540° C. for 16 hours in air.

The calcined product proved to have a surface area of 1352 $m^2/g$ and the following equilibrium adsorption capacities in grams/100 grams:

| | |
|---|---|
| $H_2O$ | 23.6 |
| Cyclohexane | >50 |
| n-Hexane | 49 |
| Benzene | 67.5 |

Figure 11:
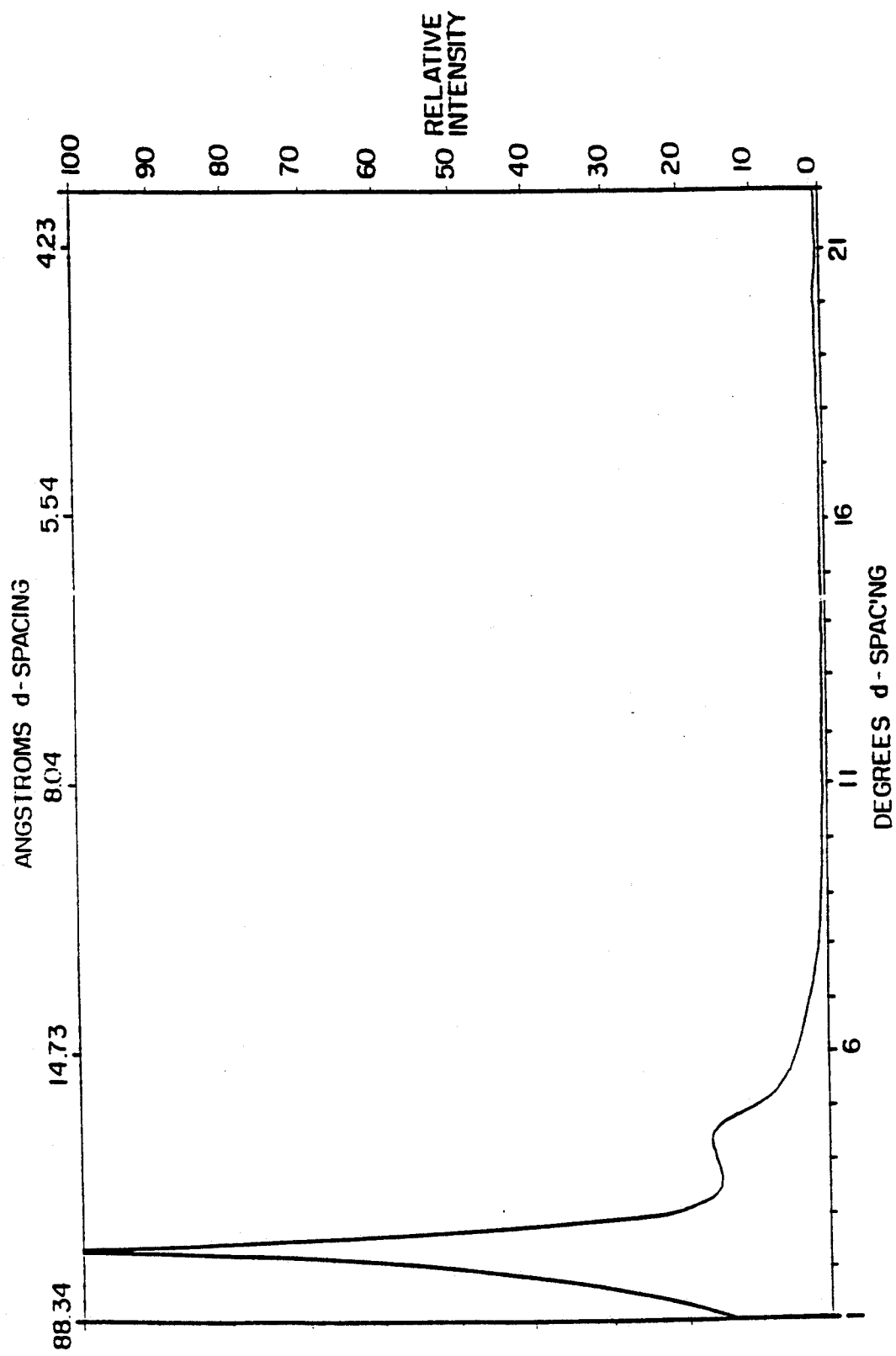

The X-ray diffraction pattern of the calcined product of this example is shown in FIG. 11. The product of this example may be characterized as including a very strong relative intensity line at 38.5±2.0 Angstroms d-spacing and a weak line at 20.3±1.0 Angstroms. TEM indicated that the product contained the present ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 4.40 moles | $(TMA)_2O$ |
| 650 moles | $H_2O$ |

Figure 12:
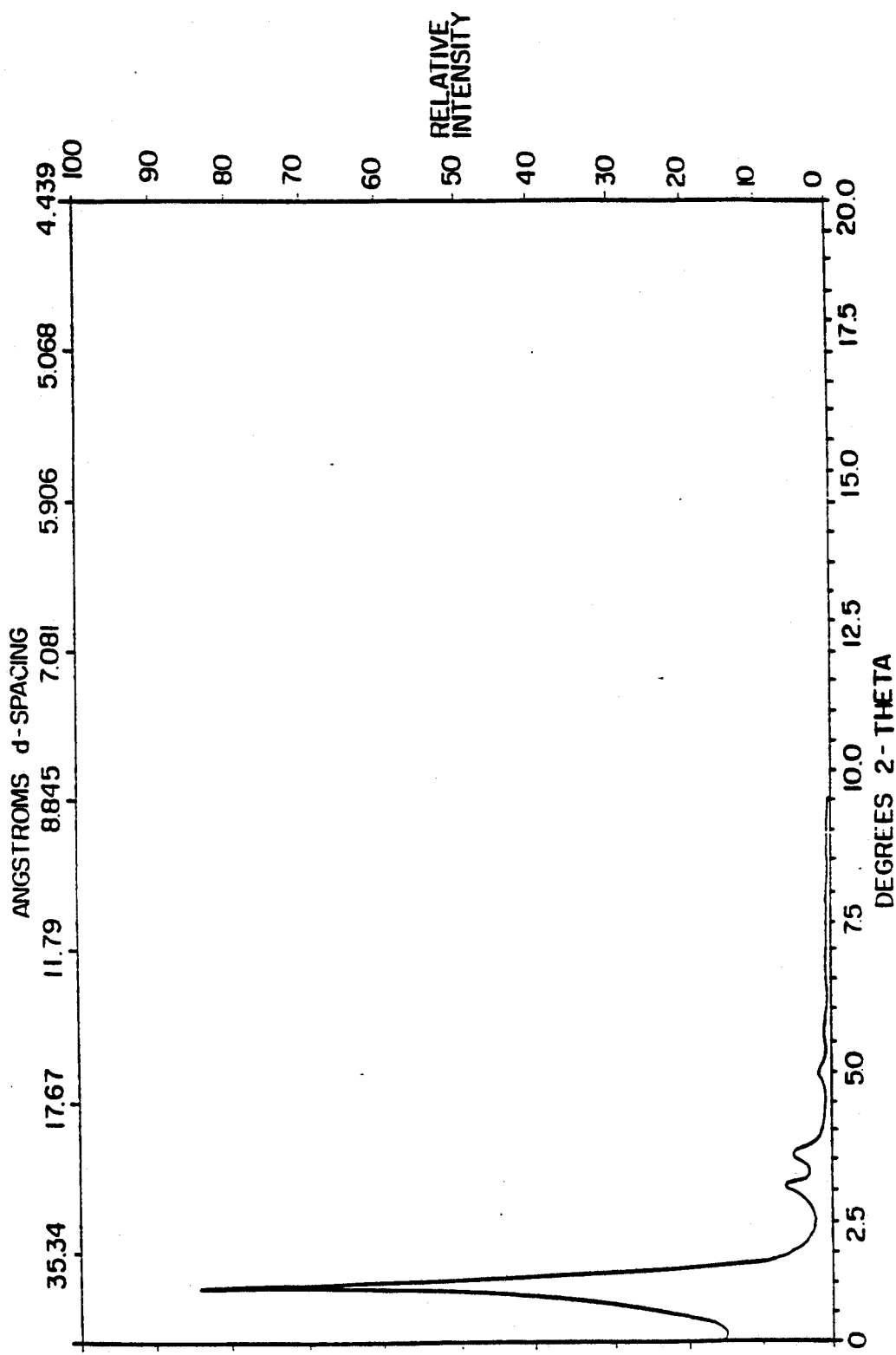

The resulting solid product was recovered by filtration and dried in air at ambient temperature. The product was then calcined at 540° C. for 1 hour in nitrogen, followed by 6 hours in air. TEM indicated that this product contained the present ultra-large pore material. The X-ray diffraction pattern of the calcined product of this example is shown in FIG. 12. This pattern can be characterized as including a very strong relative intensity line at 44.2±2.0 Angstroms d-spacing and weak lines at 25.2±1.5 and 22.0±1.0 Angstroms.

The calcined product proved to have a surface area of 932 m²/g and the following equilibrium adsorption capacities in grams/100 grams:

| | |
|---|---|
| $H_2O$ | 39.3 |
| Cyclohexane | 46.6 |
| n-Hexane | 37.5 |
| Benzene | 50 |

The product of this example was then ammonium exchanged with 1 N $NH_4NO_3$ solution, followed by calcination at 540° C. for hours in air.

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 4.4 moles | $(TMA)_2O$ |
| 650 moles | $H_2O$ |

The resulting solid product was recovered by filtration and dried in air at ambient temperature. The product was then calcined at 540° C. for 1 hour in nitrogen, followed by 6 hours in air.

The calcined product proved to have the following equilibrium adsorption capacities in grams/100 grams:

| | |
|---|---|
| $H_2O$ | 35.2 |
| Cyclohexane | >50 |

-continued

| | |
|---|---|
| n-Hexane | 40.8 |
| Benzene | 53.5 |

Figure 13:
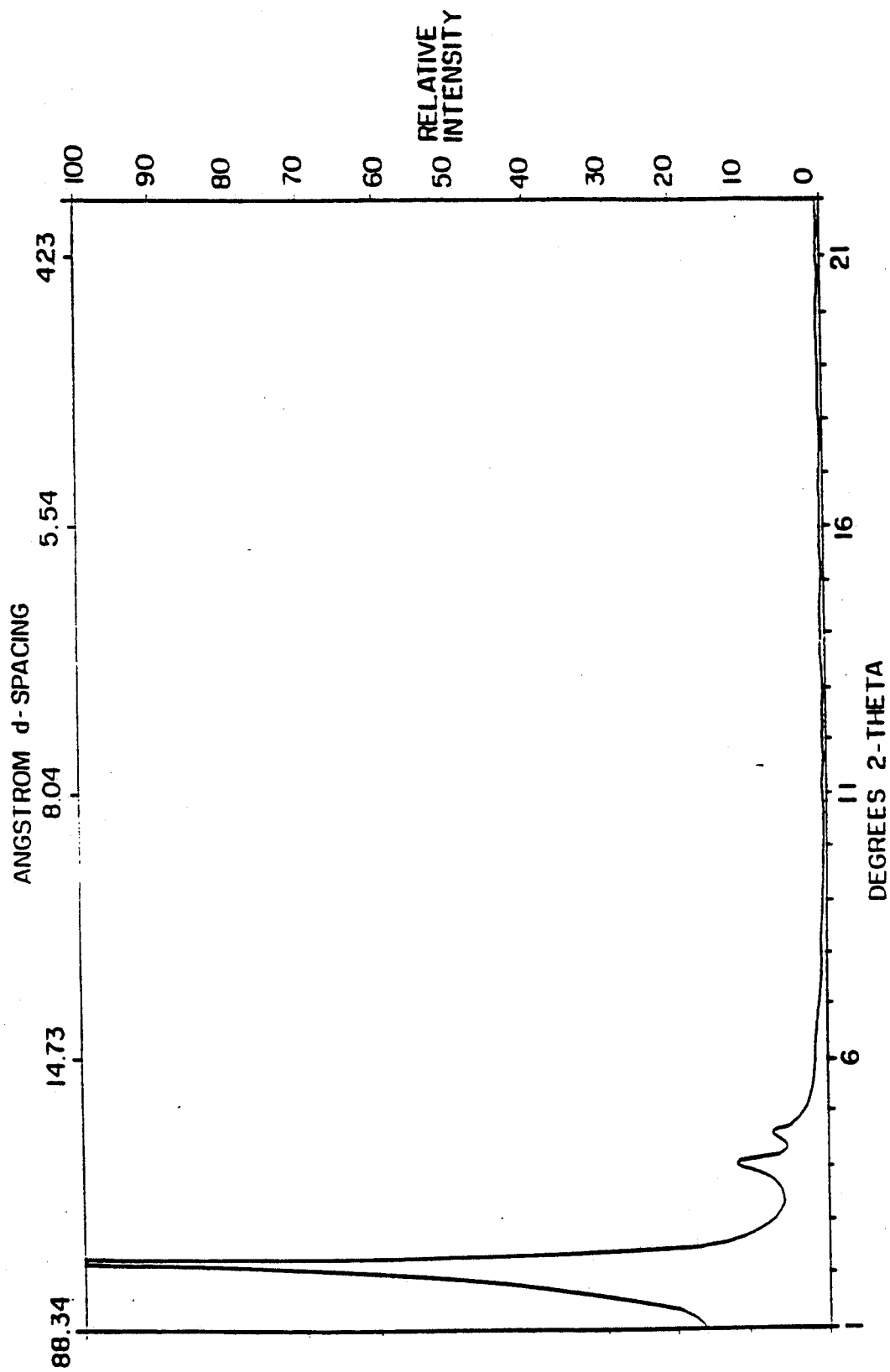

The X-ray diffraction pattern of the calcined product of this example is shown in FIG. 13. This product may be characterized as including a very strong relative intensity line at 39.1±2.0 Angstroms d-spacing and weak lines at 22.4±1.0 and 19.4±1.0 Angstroms. TEM indicated that this product contained the present ultra-large pore material.

The product of this example was then ammonium exchanged with 1 N $NH_4NO_3$ solution, followed by calcination at 540° C. for 10 hours in air.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 ( grams $H_2O$) was stirred thoroughly and crystallized at 150° C. for hours. The reaction mixture had the following relative molar composition in terms of moles per mole silica:

| | |
|---|---|
| 0.10 moles | $(CTMA)_2O$ |
| 21.89 moles | $H_2O$ |
| 0.036 moles | $NaAlO_2$ |
| 0.53 moles | NaOH |

The solid product was isolated by filtration, washed with water, dried for 16 hours at room temperature and calcined at 540° C. for 10 hours in air.

The calcined product proved to have a surface area of 840 m²/g, and the following equilibrium adsorption capacities in grams/100 grams:

| | |
|---|---|
| $H_2O$ | 15.2 |
| Cyclohexane | 42.0 |
| n-Hexane | 26.5 |
| Benzene | 62 |

Figure 14:
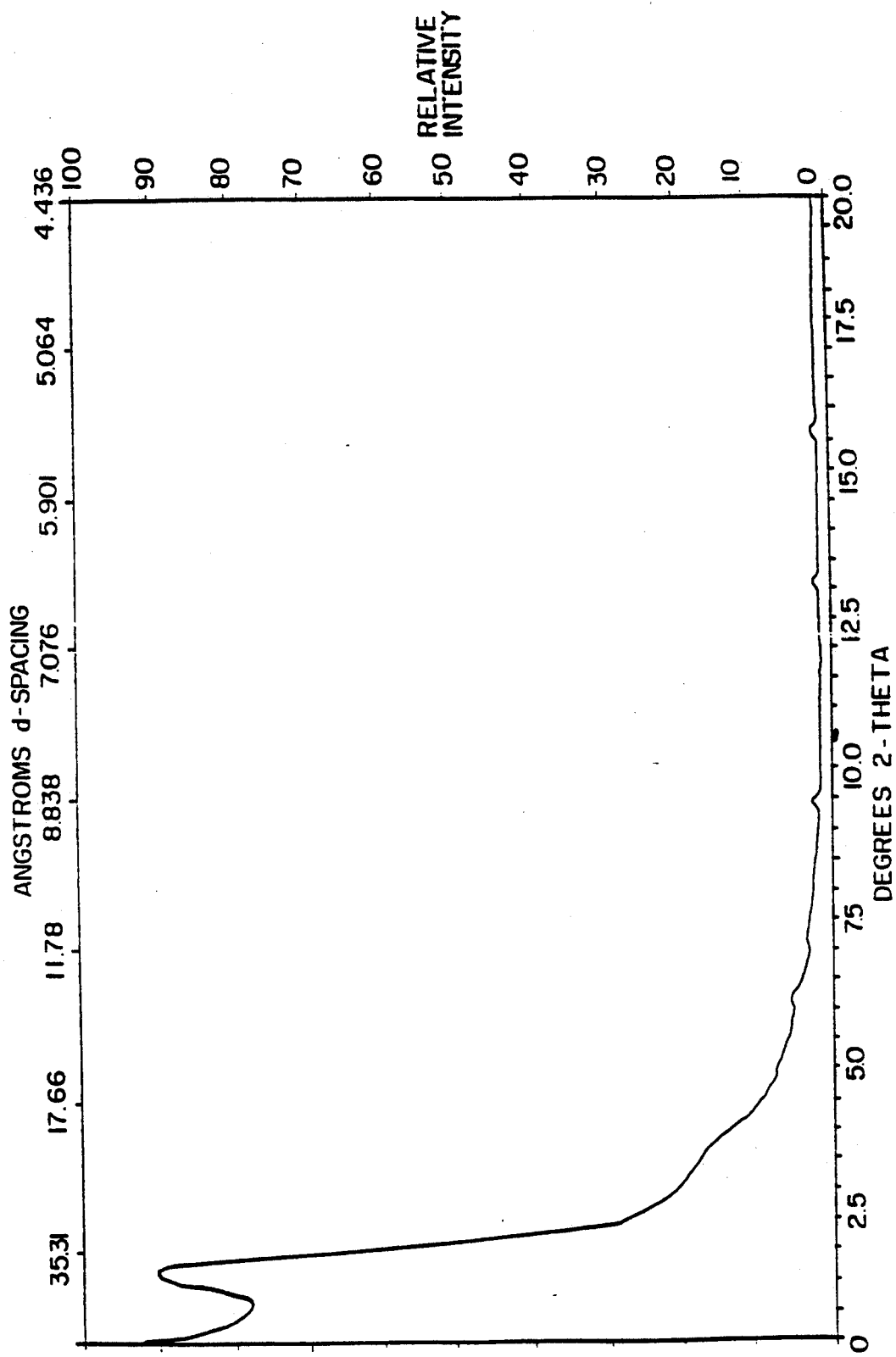

The X-ray diffraction pattern of the calcined product of this Example, shown in FIG. 14, may be characterized as including a very strong relative intensity line at 40.5±2.0 Angstroms d-spacing. TEM indicated that the product contained the present ultra-large pore material.

EXAMPLE 15

For comparison purposes, a commercially prepared ultra-stable zeolite Y was obtained. It had a benzene equilibrium adsorption capacity of 20.7 grams/100 grams. Its X-ray diffraction pattern had all the lines of zeolite Y with its highest value peak at about 14.0 Angstroms d-spacing.

EXAMPLE 16

To make the primary template mixture for this example, 240 grams of water was added to a 92 gram solution of 50% dodecyltrimethylammonium hydroxide, 36% isopropyl alcohol and 14% water such that the mole ratio of Solvent/$R_2/_fO$ was 155. The mole ratio of $H_2O/R_2/_fO$ in this mixture was 149 and the IPA/$R_2/_fO$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution. The mole ratio of $R_{2/f}O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

| | |
|---|---|
| 0.05 mole | $Na_2O$ |
| 0.036 mole | $Al_2O_3$ |
| 0.18 mole | $(C_{12}TMA)_2O$ |
| 0.12 mole | $(TMA)_2O$ |
| 36.0 moles | $H_2O$ |
| 1.0 mole | IPA |

The resulting solid product was recovered by filtration, washed with water and dried in air at ambient temperature. The product was then calcined at 540° C. for 1 hour in nitrogen, followed by 6 hours in air.

The calcined product proved to have a surface area of 1223 $m^2/g$ and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

Figure 15:
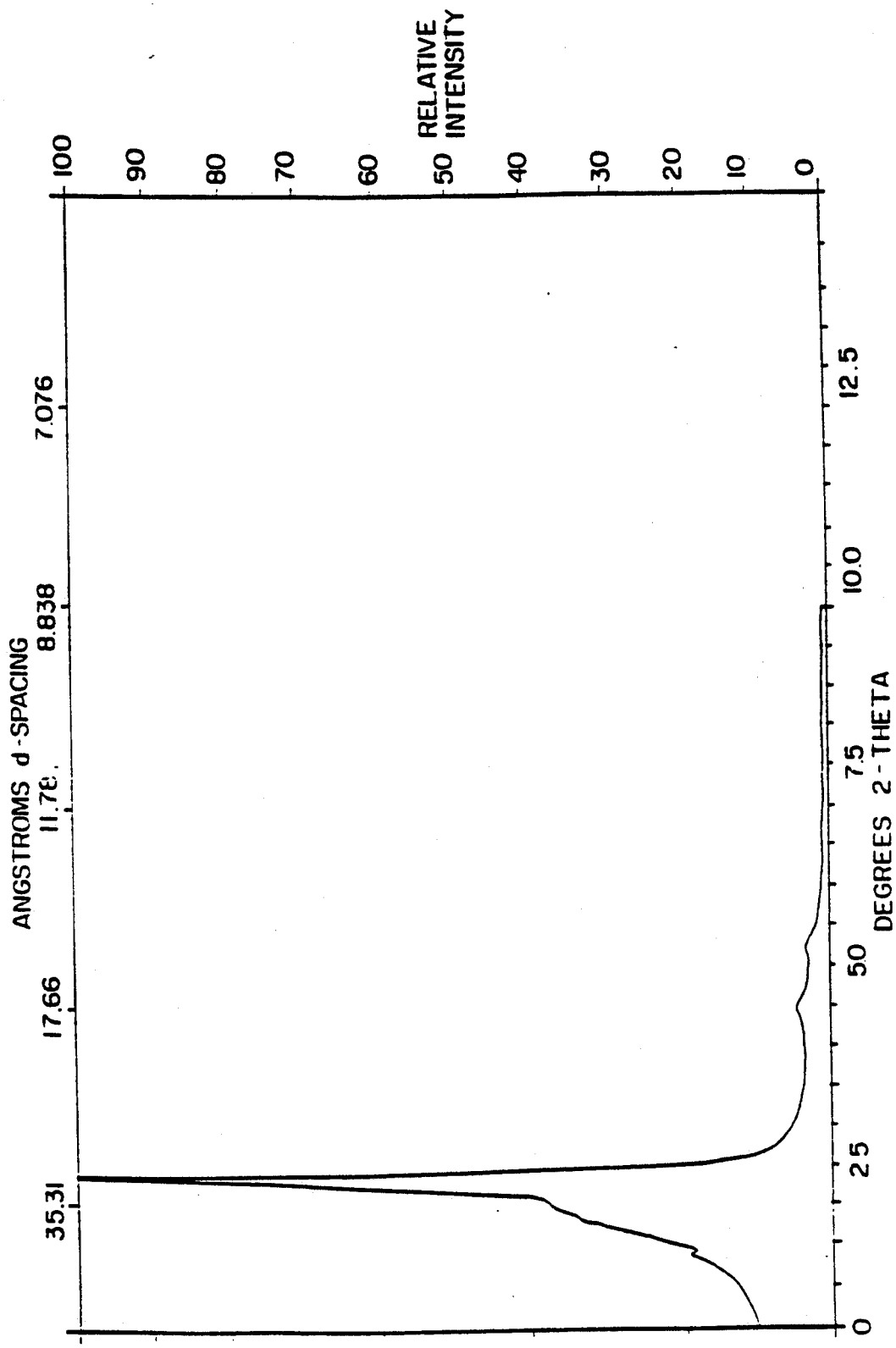

The X-ray diffraction pattern of the calcined product of this example is shown in FIG. 15. This product may be characterized as including a very strong relative intensity line at 30.8±1.5 Angstroms d-spacing and weak lines at 17.9±1.0 and 15.5±1.0 Angstroms. TEM indicated this product to contain the present ultra-large pore material.

EXAMPLE 17

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

| | |
|---|---|
| 0.81 mole | $(C_{10}TMA)_2O$ |
| 47.6 moles | $H_2O$ |

The resulting solid product was filtered and washed several times with warm (60°-70° C.) distilled water and with acetone. The final product was calcined to 538° C. in $N_2$/air mixture and then held in air for about 8 hours.

The calcined product proved to have a surface area of 915 $m^2/g$ and an equilibrium benzene adsorption capacity of 35 grams/100 grams. Argon physisorption data indicated an argon uptake of 0.34 cc/gram, and a pore size of 15 Angstroms.

The X-ray diffraction pattern of the calcined product of this example may be characterized as including a very strong relative intensity line at 27.5±1.5 Angstroms d-spacing and weak lines at 15.8±1.0 and 13.7±1.0 Angstroms. TEM indicated that the product of this example contained the present ultra-large pore material.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 2.24 moles | $(TMA)_2O$ |
| 2256 moles | $H_2O$ |
| 80.53 moles | 1,3,5-trimethylbenzene |

The resulting product was filtered and washed several times with warm (60°-70° C.) distilled water and with acetone. The final product was calcined to 538° C. in $N_2$/air mixture and then held in air for about 10 hours.

The calcined product proved to have an equilibrium benzene adsorption capacity of >25 grams/100 grams.

The X-ray diffraction pattern of the calcined product of this example may be characterized as including a broad, very strong relative intensity line at about 102 Angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Angstroms d-spacing and about 120 Angstroms d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAl_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |

| | |
|---|---|
| 2.24 moles | (TMA)₂O |
| 2256 moles | H₂O |
| 132.7 moles | 1,3,5-trimethylbenzene |

The resulting product was filtered and washed several times with warm (60°-70° C.) distilled water and with acetone. The final product was calcined to 538° C. in $N_2$/air mixture and then held in air for about 10 hours.

The calcined product proved to have a surface area of 915 m²/g and an equilibrium benzene adsorption capacity of >25 grams/100 grams. Argon physisorption data indicated an argon uptake of 0.95 cc/gram, and a pore size centered on 78 Angstroms (Dollimore-Heal Method, see Example 22(b)), but running from 70 to greater than 105 Angstroms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different $d_{100}$ values as observed in their electron diffraction patterns. These materials were found to possess $d_{100}$ values between about 85 Angstroms d-spacing and about 110 Angstroms d-spacing.

EXAMPLE 20

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

| | |
|---|---|
| 1.25 moles | Na₂O |
| 27.8 moles | SiO₂ |
| 5.1 moles | (CTMA)₂O |
| 2.24 moles | (TMA)₂O |
| 650 moles | H₂O |
| 19.9 moles | 1,3,5-trimethylbenzene |

The resulting product was filtered and washed several times with warm (60-70° C.) distilled water and with acetone. The final product was calcined to 538° C. in $N_2$/air mixture and then held in air for about 8 hours.

The calcined product proved to have a surface area of 975 m²/g and an equilibrium benzene adsorption capacity of >40 grams/100 grams. Argon physisorption data indicated an argon uptake of 0.97 cc/gram, and a pore size of 63 Angstroms (Dollimore-Heal Method, see Example 22(b)), with the peak occurring at $P/P_o = 65$.

The X-ray diffraction pattern of the calcined product of this example may be characterized as including a very strong relative intensity line at 63±5 Angstroms d-spacing and weak lines at 36.4±2.0, 31.3±1.5 Angstroms and 23.8±1.0 Angstroms d-spacing. TEM indicated that the product of this example contained the present ultra-large pore material.

EXAMPLE 21

For catalytic evaluation of the present invention, final products from Examples 1 through 15 were evaluated for dealkylation of tri-tert-butylbenzene (TBB) to di-tert butylbenzene. The present evaluation was conducted under one or both of two sets of conditions: (i) at a temperature of 225° C., weight hourly space velocity of 100 hr⁻¹ or (ii) at a temperature of 200° C., weight hourly space velocity of 200 hr⁻¹. Pressure was atmospheric. The feed was composed of 6.3/93.7 TTBB/toluene. Conversion was measured at 30 minutes on stream. The results were as follows:

| Catalyst of Example | Conversion, wt. % | |
|---|---|---|
| | 225° C./100 hr⁻¹ | 200° C./200 hr⁻¹ |
| 1 | 0 | — |
| 2 | 6.2 | — |
| 3 | 53.9 | — |
| 4 | 10.4 | — |
| 5 | 68.9 | — |
| 6 | 100.0 | — |
| 7 | 93.4 | 66.0 |
| 8 | 5.3 | — |
| 9 | — | 61.2 |
| 10 | — | 58.9 |
| 11 | 86.3 | — |
| 12 | 96.7 | — |
| 13 | 92.8 | — |
| 14 | — | 37.7 |
| 15 | 12.0 | 0 |

EXAMPLE 22(a)

Argon Physisorption For Pore Systems Up to About 60 Angstroms Diameter

To determine the pore diameters of the products of this invention with pores up to about 60 Angstroms in diameter, 0.2 gram samples of the products of Examples 1 through 17 were placed in glass sample tubes and attached to a physisorption apparatus as described in U.S. Pat. No. 4,762,010, which is incorporated herein by reference.

Figure 16:
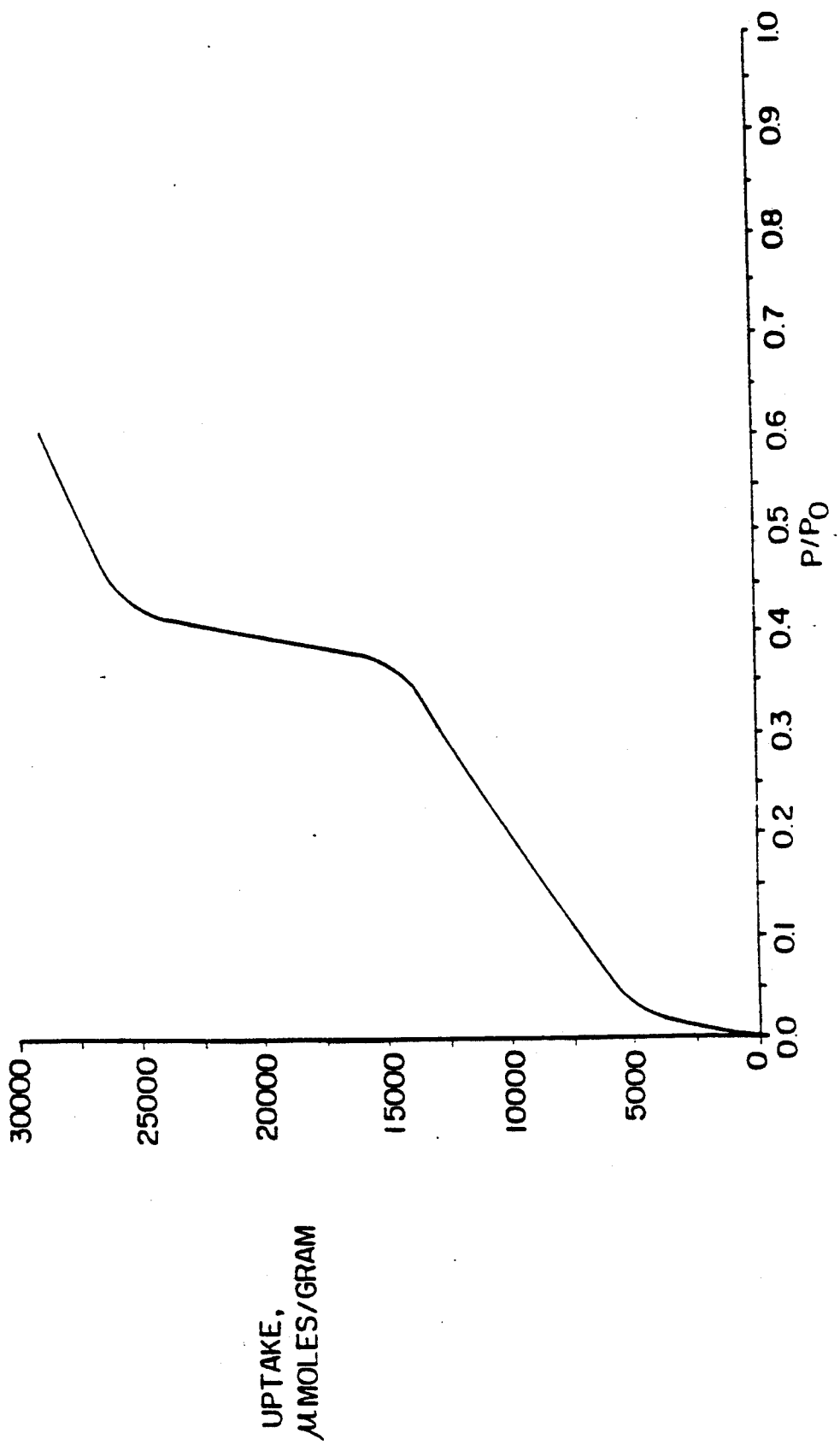
FIG. 16 is an isotherm plot of physisorption measurements from Example 22.

The samples were heated to 300° C. for 3 hours in vacuo to remove adsorbed water. Thereafter, the samples were cooled to 87° K by immersion of the sample tubes in liquid argon. Metered amounts of gaseous argon were then admitted to the samples in stepwise manner as described in U.S. Patent No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm as shown in FIG. 16 for the Example 4 product sample. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

Figure 17:
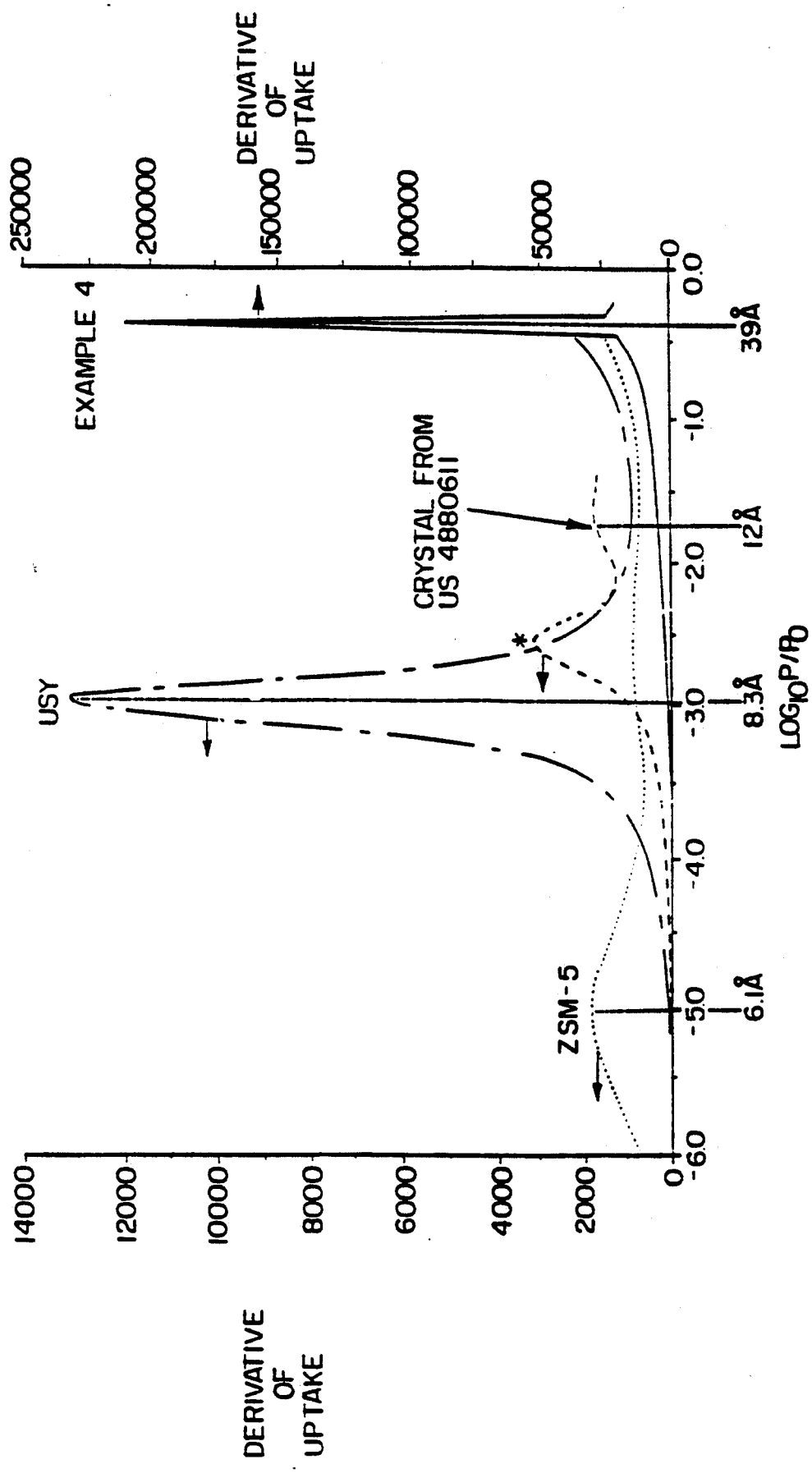
FIG. 17 is a plot of physisorption measurements from Example 22 showing pore sizes of various crystalline materials.

The step (inflection) in the isotherm, in this case (Example 4 product) at about $P/P_o=0.4$, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. This is shown in FIG. 17. Also shown in FIG. 17 are data obtained in an identical fashion for a crystalline material from U.S. Pat. No. 4,880,611 and several other crystal materials. There is further provided a physical scale on the axis which converts the position of an adsorption peak in terms of log $(P/P_o)$ to the physical pore diameter in Angstroms. This conversion was obtained by using the following formula:

$$\log(P/P_o) = \frac{K}{d - 0.38}\left(\frac{S^4}{3(L - D/2)^3} - \frac{S^{10}}{9(L - D/2)^9} - \frac{S^4}{3(D/2)^3} + \frac{S^{10}}{9(D/2)^9}\right)$$

wherein d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Angstroms in diameter.

As is indicated in FIG. 17, the pore size of the material of Example 4 is 39.6 Angstroms with the peak occurring at log $(P/P_o)=-0.4$ or $P/P_o=0.4$, while the pore size of the material from U.S. Pat. No. 4,880,611 is 12 Angstroms or $P/P_o=0.02$. In the other materials, a peak is observed at $P/P_o=0.015$ which is denoted by an asterisk in FIG. 17. This peak reflects adsorption on the walls of the pores and is not otherwise indicative of the size of the pores of a given material. A value of $P/P_o$ of 0.03 corresponds to 13 Angstroms pore size.

The results of this procedure for the samples from Examples 1 through 17 are tabulated below. The samples from Examples 10, 13 and 16 gave two separate peaks, believed to be the result of two separate ultralarge pore phases in the products.

| Examples | Pore Diameter, Angstroms |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 8.3 |
| 16 | 22.4, 30.4 |
| 17 | 15.0 |

EXAMPLE 22(b)

Argon Physisorption For Pore Systems Over About 60 Angstrom Units Diameter

In the pore regime above 60 Angstrom Units diameter, the Kelvin equation can be applied. It is usually given as:

$$\ln(P/P_o) = \frac{-2\gamma V}{r_k RT}\cos\theta$$

where:
$\gamma$=surface tension of sorbate
V=molar volume of sorbate
$\theta$=contact angle (usually taken for practical reasons to be 0)
R=gas constant
T=absolute temperature
$r_k$=capillary condensate (pore) radius
$P/P_o$=relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom Units diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G.R. Heal, *J. Applied Chem.*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

The products of Examples 18 and 19 were subjected to the Dollimore and Heal Method for argon physisorption data, as indicated.

EXAMPLE 23

Transmission Electron Microscopy

To further illustrate the nature of the hexagonal crystalline product of this invention, samples of the products from Examples 1-13, 15-20, and 24-26 were studied by transmission electron microscopy (TEM) as noted above. TEM is a technique used to reveal the microscopic structure of materials, including crystalline materials.

In order to illuminate the microstructure of materials, samples must be thin enough for an electron beam to pass through them, generally about 500-1000 Angstrom Units thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L.R. WHITE (hard), which is then cured at about 80° C. for about 1½ hours. Thin sections of the block are cut on an ultramicrotome using a diamond knife and sections in the thickness range 500-1000 Angstrom Units are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

A simpler specimen preparation technique can be used with some synthesis preparations if mere verification of the presence of the material of the invention is desired. This involves deposition of a dispersion of the material on a carbon-coated lacy Formvar electron microscope support after grinding and sonication in propanol. Fragments or regions sufficiently thin to obtain electron diffraction patterns and lattice images can normally be found near the edges of the crystals.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g., the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

Figure 18:
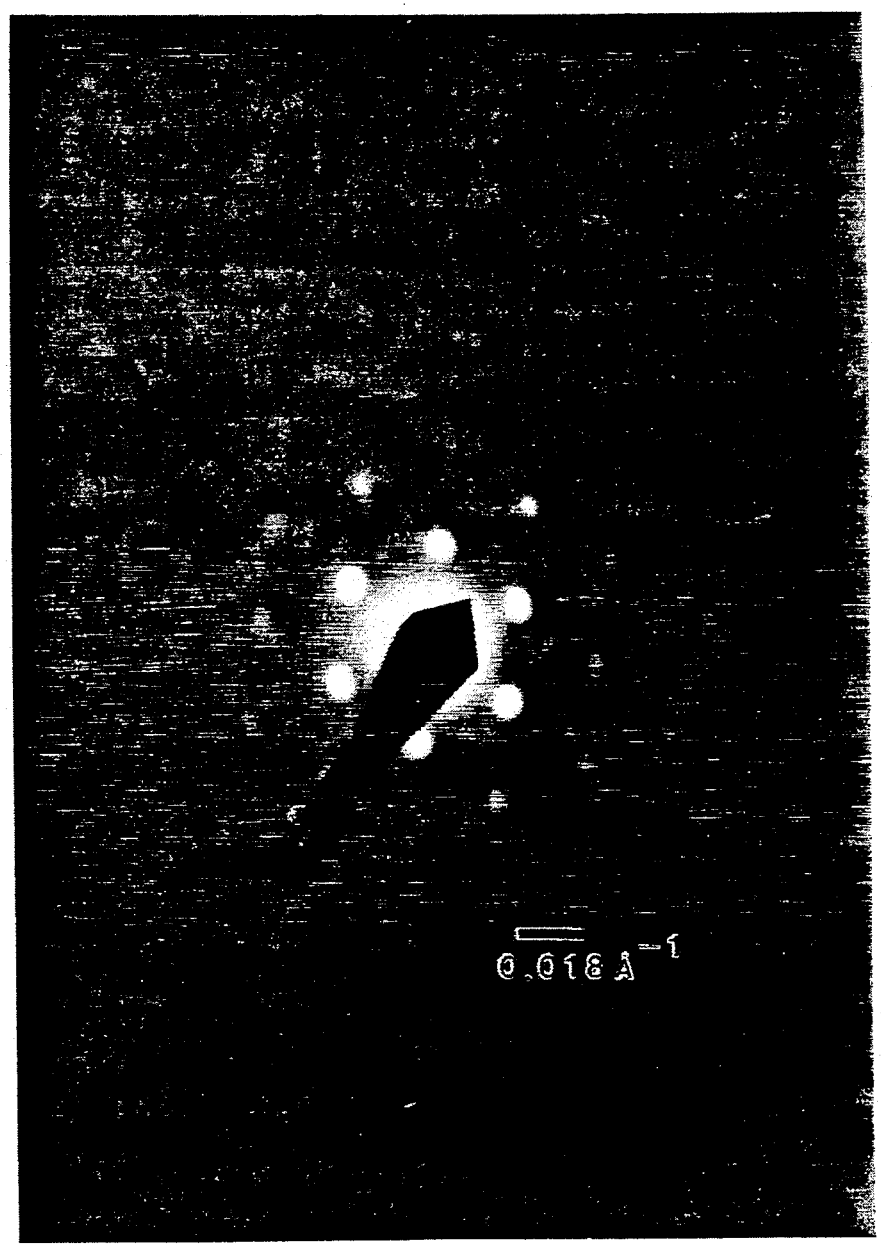
FIG. 18 is an electron diffraction pattern of the product of Example 4.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. An example of a hexagonal pattern from an individual crystal from the product in Example 4 is shown in FIG. 18. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs discussed below.

Figure 19:
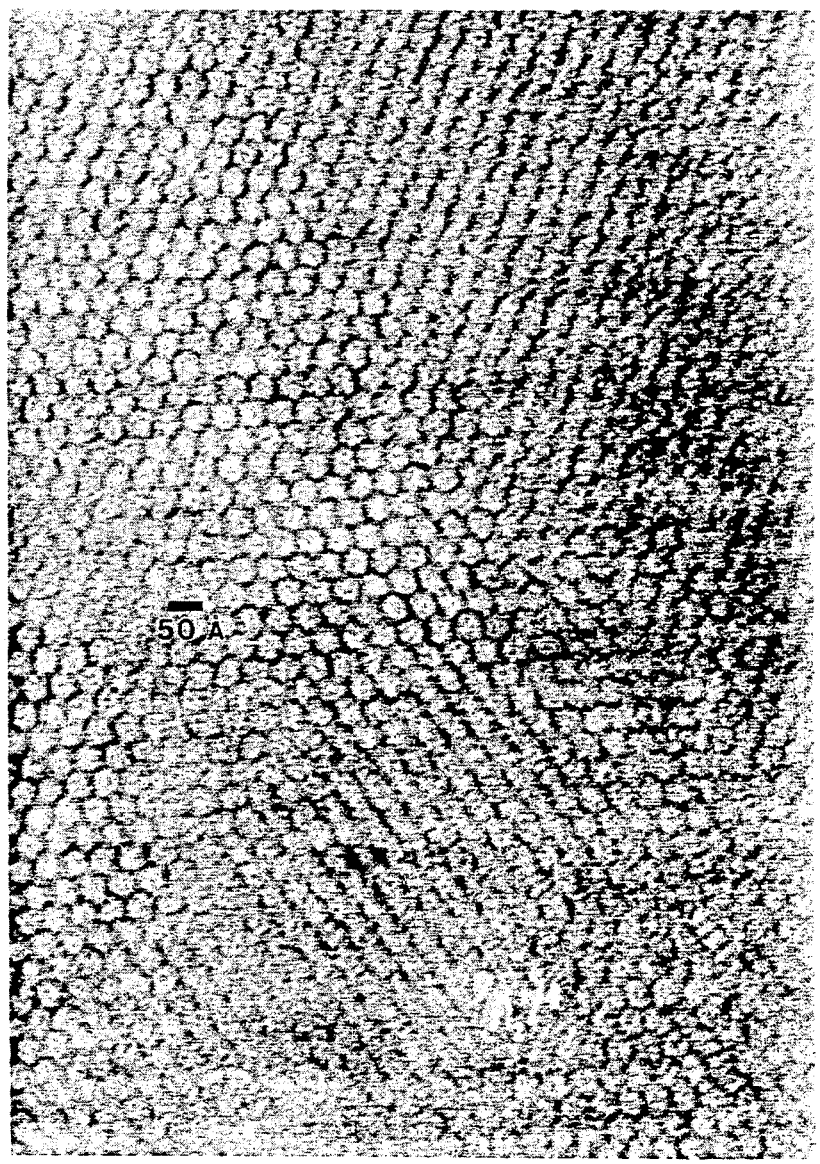
FIG. 19 is a transmission electron micrograph of the product of Example 4.

Microtomed samples of materials from the Examples 1-13, 15-20 and 24-26 were examined by the techniques described above in a JEOL 200 CX transmission electron microscope operated at 200,000 volts with an effective 2 Angstrom Units objective aperture in place. The instrument has a point-to-point resolution of 4.5 Angstrom Units. Other experimental arrangements familiar to one skilled in the art of high resolution (phase contrast) TEM could be used to produce equivalent images provided care is taken to keep the objective lens on the underfocus side of the minimum contrast lens current setting. FIG. 19 is an electron micrograph from a microtomed thin section of the crystalline product from Example 4. This micrograph shows a reasonably regular array of large channels in a hexagonal arrangement. The repeat distance between the channels is about 45 Angstrom units, which is consistent with the position of the first peak in the X-ray (diffraction pattern $$(41 \text{ Angstroms}/\sqrt{3}/2)$$

of this material. Since the channels must have walls between them, this observation is also consistent with the estimated pore size of about 39.6 Angstrom Units calculated from Argon physisorption measurements of this material in Example 22(a).

Figure 20:
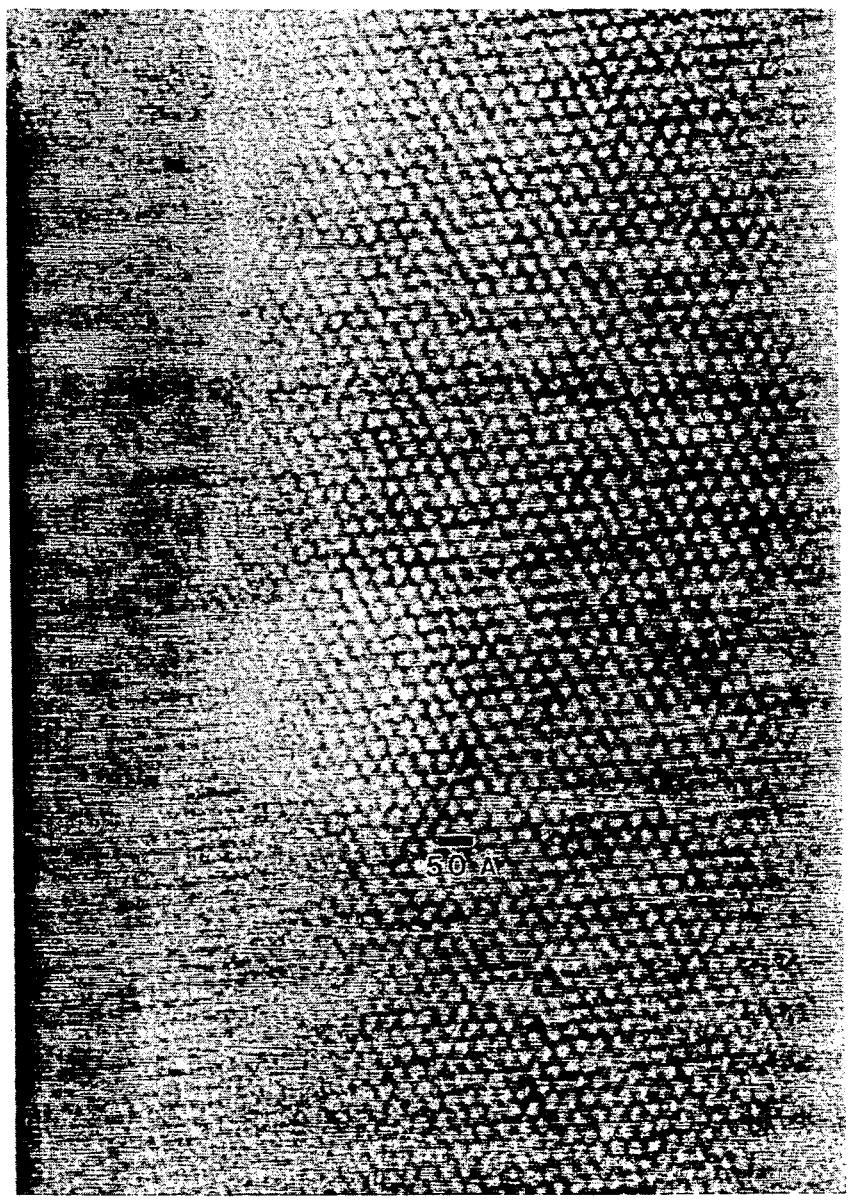
FIG. 20 is a transmission electron micrograph of the product of Example 5.

FIG. 20 is an electron micrograph from a microtomed thin section of the crystalline product from Example 5. This micrograph shows a reasonably regular array of somewhat smaller channels in a hexagonal arrangement. The repeat distance between the channels is about 30 Angstrom Units, which is consistent with the position of the first peak in the X-ray diffraction pattern $$(25 \text{ Angstroms}/\sqrt{3}/2)$$

of this material. The smaller pore size of this material was also verified by Argon physisorption measurements reported in Example 22(a), where a value of 16.9 Angstrom Units was calculated for the material in Example 5.

Figure 21:
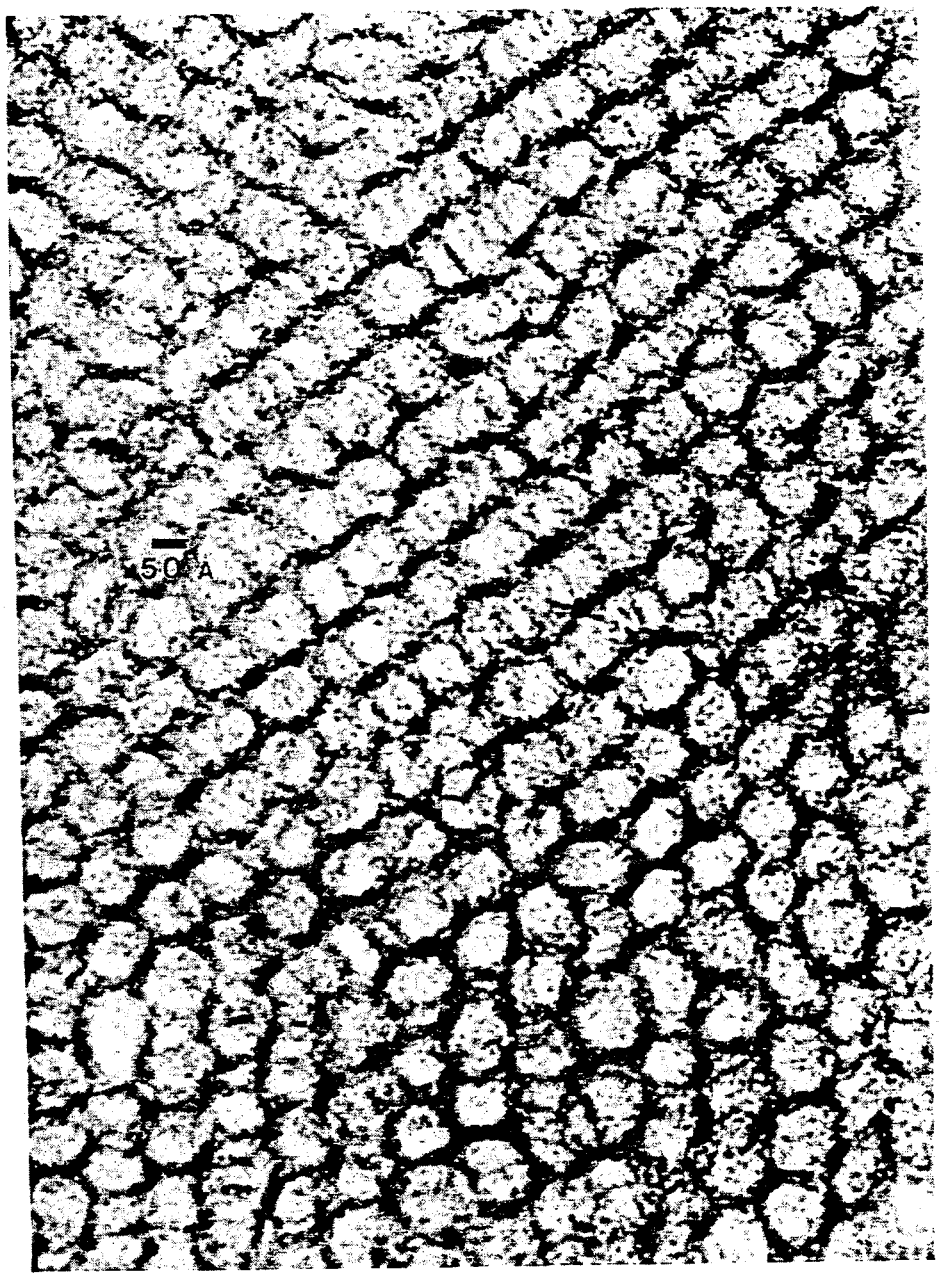
FIG. 21 is a transmission electron micrograph of the product of Example 19.

FIG. 21 is an electron micrograph from a microtomed thin section of the crystalline product from Example 18. The channels in this image are quite large and rather irregular, but the characteristic hexagonal arrangement of the material of the present invention is evident.

EXAMPLE 24

The procedure of Example 5 was generally followed except for the substitution of aqueous CTMAOH solution for water in the first reaction mixture. Further details are provided below.

Cetyltrimethylammonium hydroxide (CTMAOH=29%), phosphoric acid (85%), Catapal ™ alumina, and pyrrolidine were combined in the following molar ratios:

| $Al_2O_3$ : | $P_2O_5$ : | $(CTMA)_2O$ : | $(Pyr)_2O$ : | $H_2O$ |
|---|---|---|---|---|
| 1 | 0.82 | 0.42 | 0.83 | 36 |

This mixture was loaded into a stainless steel autoclave and was heated with agitation for six days at 150° C. The resultant product was filtered, washed and air dried overnight. Ten grams of this product was then combined with water, CTMAOH, and an aqueous solution of tetramethylammonium silicate (TMASi) (10% silica) in the following weight ratios:

| Product | : | CTMAOH | : | TMASi | : | H₂O |
|---|---|---|---|---|---|---|
| 1 | | 3 | | 2 | | 2 |

Figure 22:
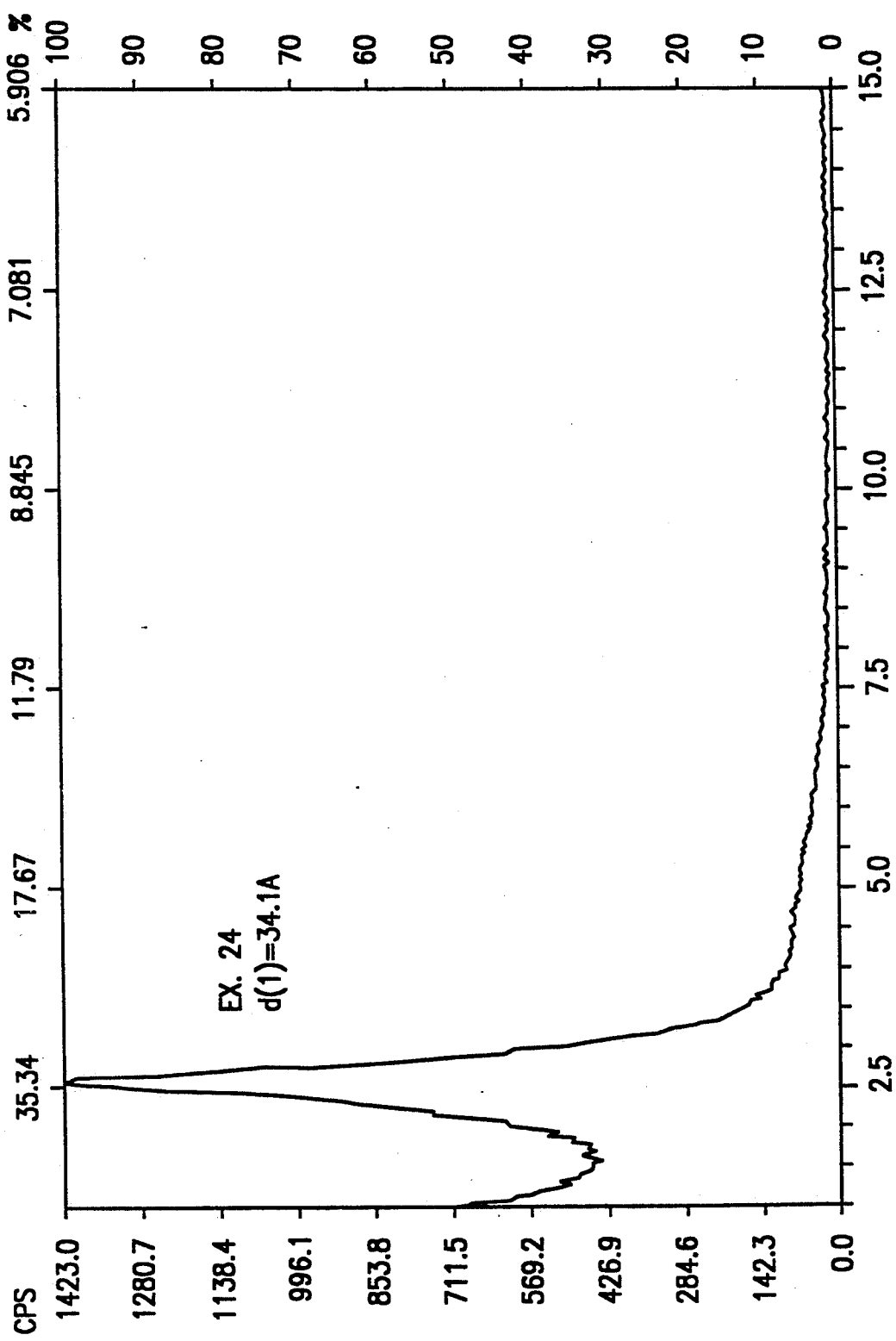
FIGS. 22, 24, and 27 are X-ray diffraction patterns of products of Examples 24, 25, and 26, respectively, hereinafter presented.
Figure 23:
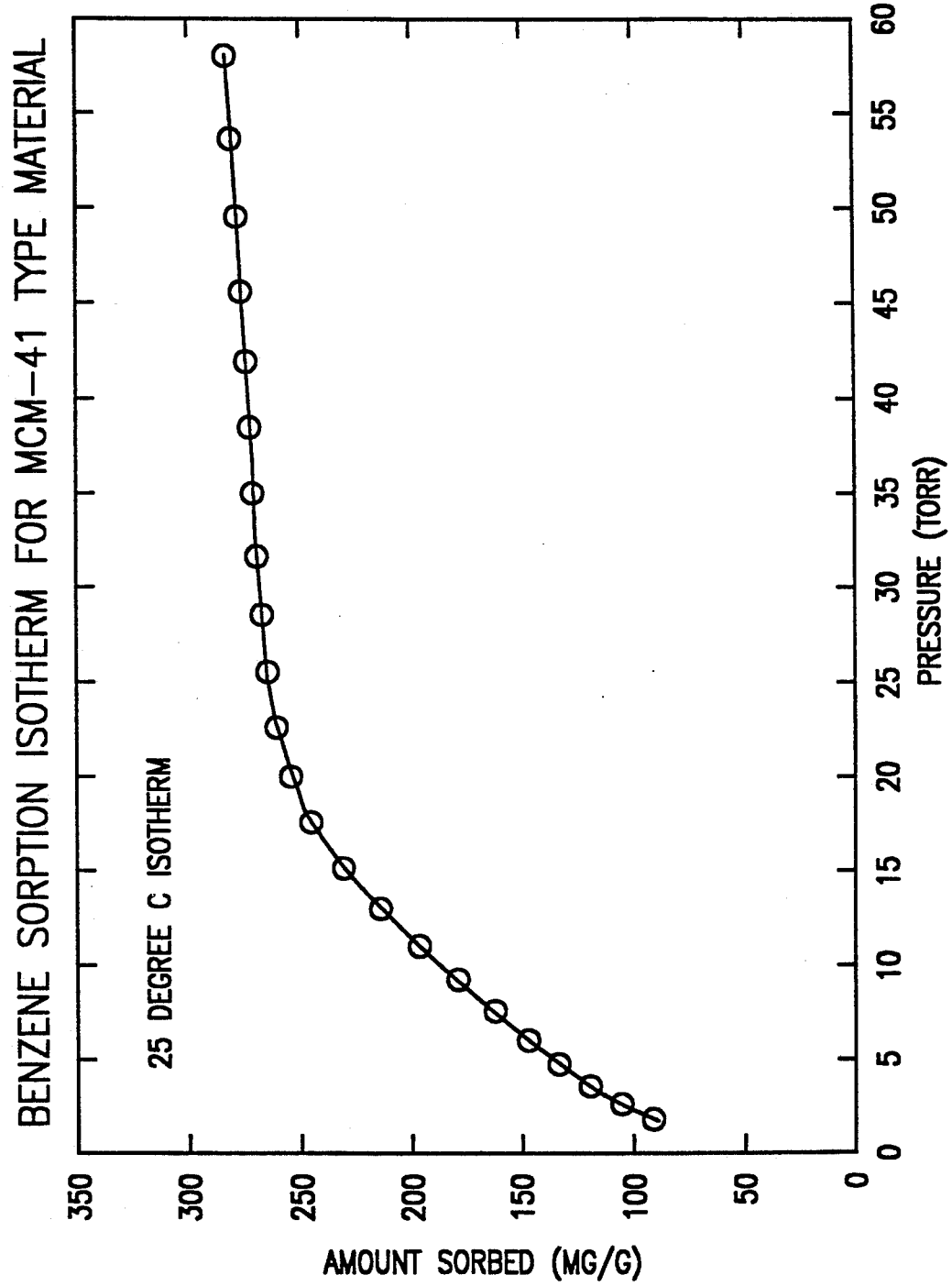
FIGS. 23, 25, and 28 are isotherm plots of physisorption measurements from Examples 24, 25, and 26, respectively.

This combined mixture was placed into a steam box (c. 100° C.) for 48 hours. After 48 hours this material was filtered, washed, and air-dried overnight. The product was calcined in $N_2$ for one hour at 540° C. followed by six hours in air. The X-ray of the calcined product is shown in FIG. 22. The benzene adsorption at 25 C is shown in FIG. 23. TEM indicated that this product contained the present ultra-large pore material.

EXAMPLE 25

Cetyltrimethylammonium chloride (CTMACL=29%), phosphoric acid (85%), Catapal TM alumina, and pyrrolidine were combined in the following molar ratios:

| $Al_2O_3$ | : | $P_2O_5$ | : | $(CTMA)_2O$ | : | $(Pyr)_2O$ | : | $H_2O$ |
|---|---|---|---|---|---|---|---|---|
| 1 | | 0.82 | | 0.39 | | 0.83 | | 36 |

This mixture was loaded into a stainless steel autoclave and was heated with agitation for six days at 150° C. The resultant product was filtered, washed and air dried overnight. Ten grams of this product was then combined with water, CTMAOH (~29%), and tetramethylammonium silicate (TMASi) (10% silica) in the following weight ratios:

| Product | : | CTMAOH | : | TMASi | : | $H_2O$ |
|---|---|---|---|---|---|---|
| 1 | | 3 | | 2 | | 2 |

Figure 24:
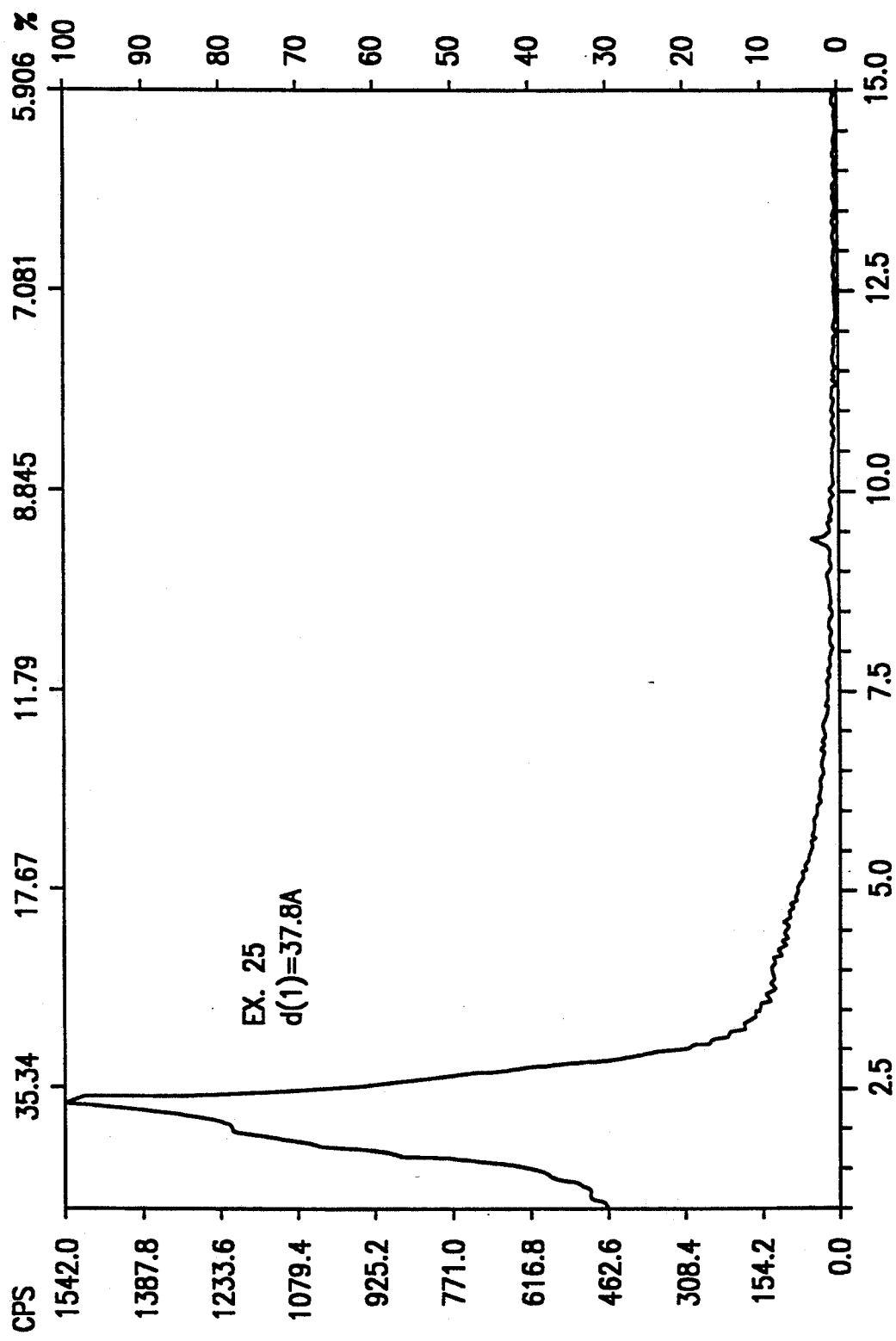
Figure 25:
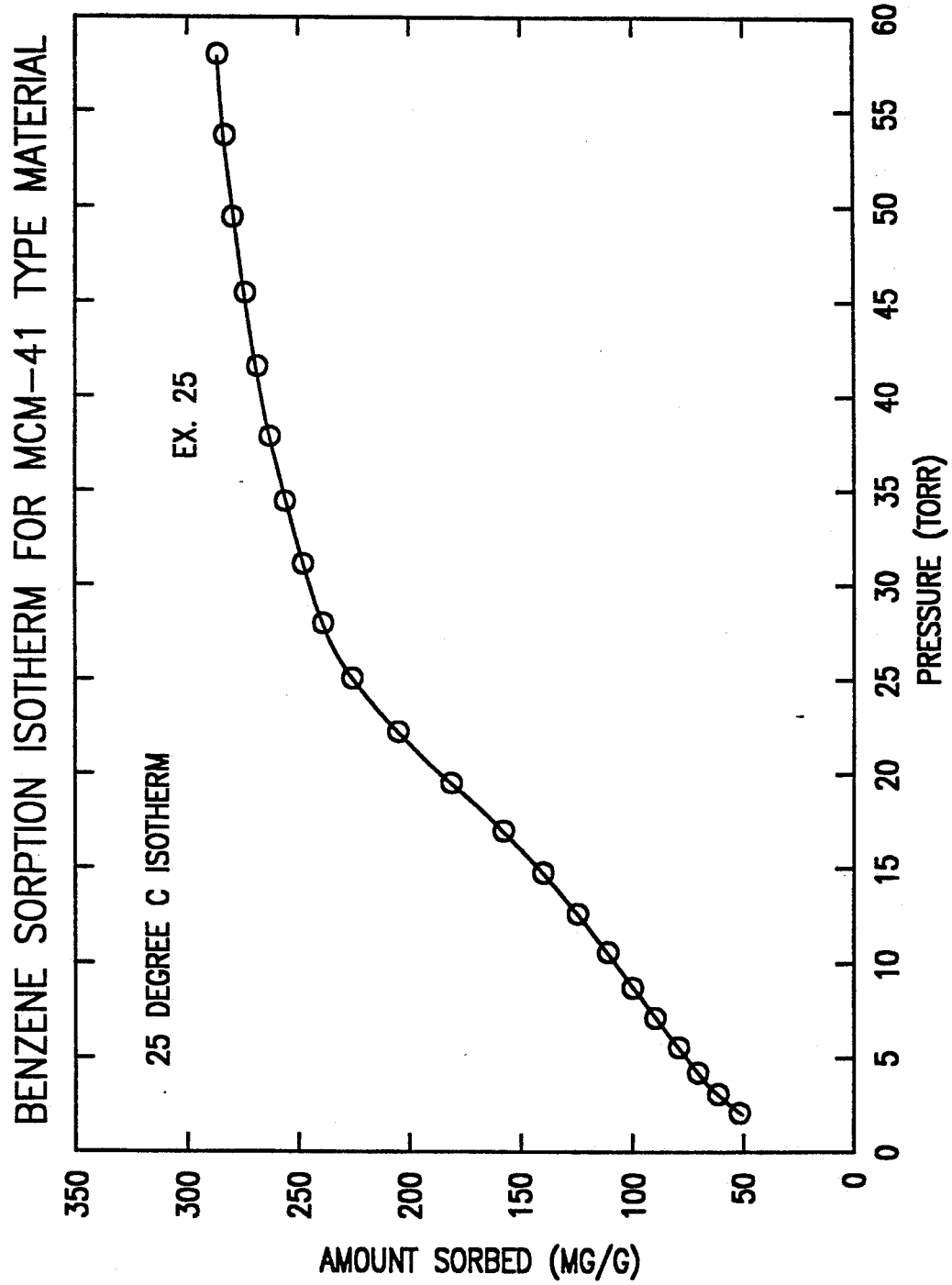

This combined mixture was placed into a steam box at about 100° C. for 48 hours. After 48 hours this material was filtered, washed, and air-dried overnight. The product was calcined in $N_2$ for one hour at 540° C. followed by six hours in air. The x-ray of the calcined product is shown in FIG. 24. TEM indicated that this product contained the present ultra-large pore material. The benzene adsorption at 25° C. is shown in FIG. 25.

Figure 26:
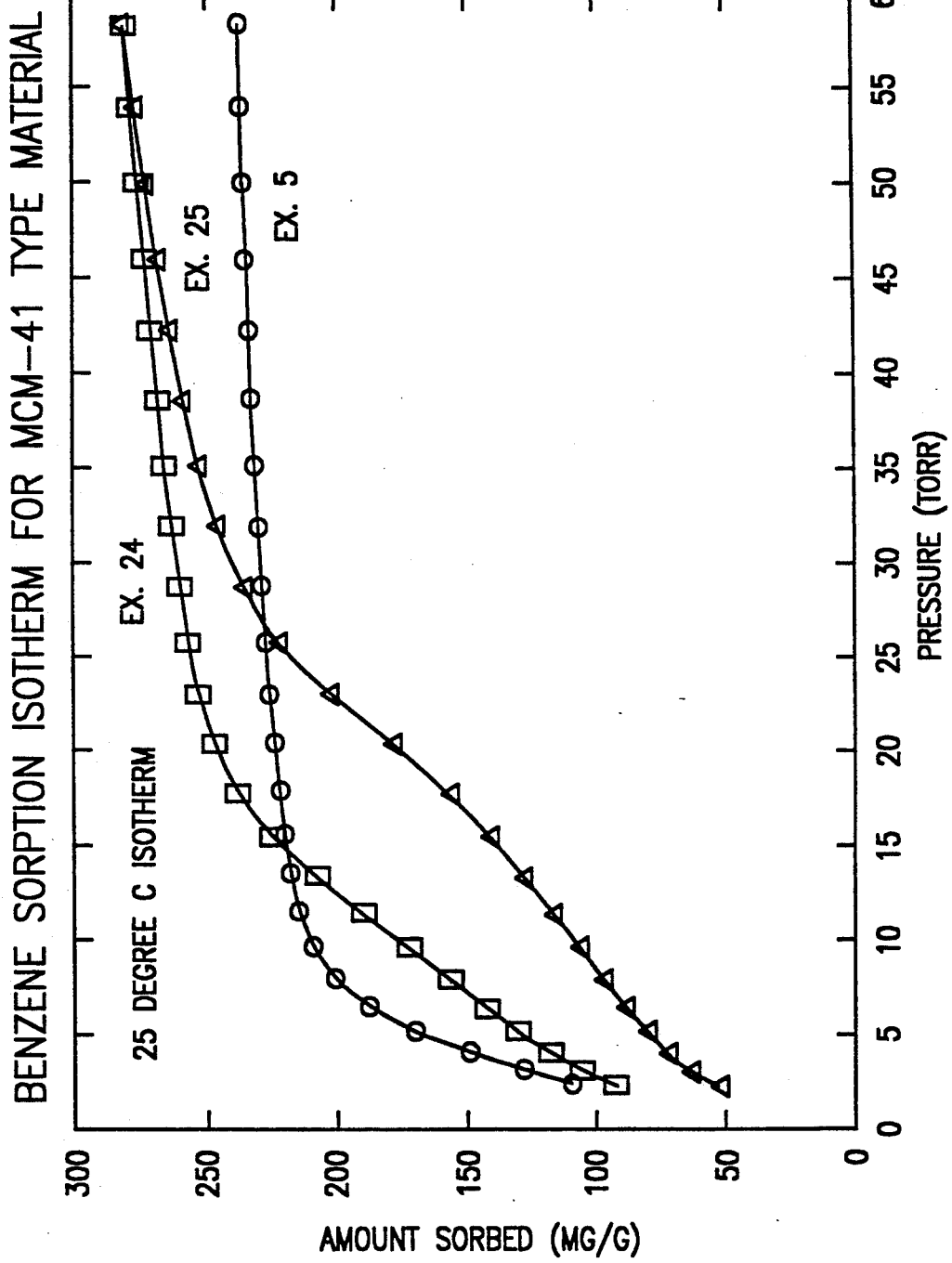
FIG. 26 is a comparative plot of physisorption measurements from Examples 5, 24, and 25, respectively.

FIG. 26 compares the benzene sorption as a function of pressure for the silicoaluminophosphates of Examples 5, 24 and 25. The inflection points of the three curves occur at different pressure values. The inflection point/pressure values increase with increasing d-spacings calculated from the primary peak of the X-ray patterns. This indicates that the inflection point occurs at higher benzene partial pressures as the pore opening of the structure gets larger.

EXAMPLE 26

Figure 27:
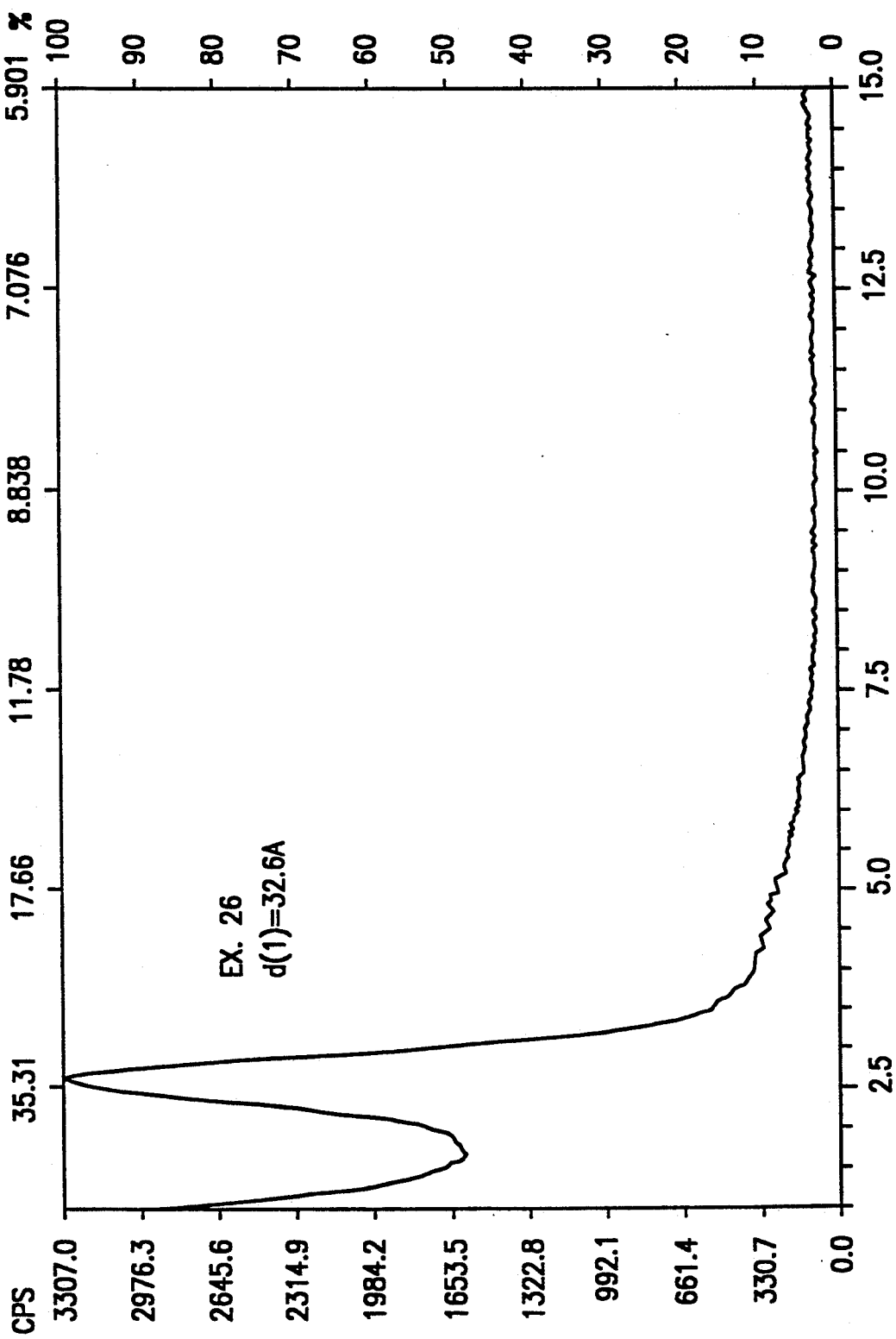
Figure 28:
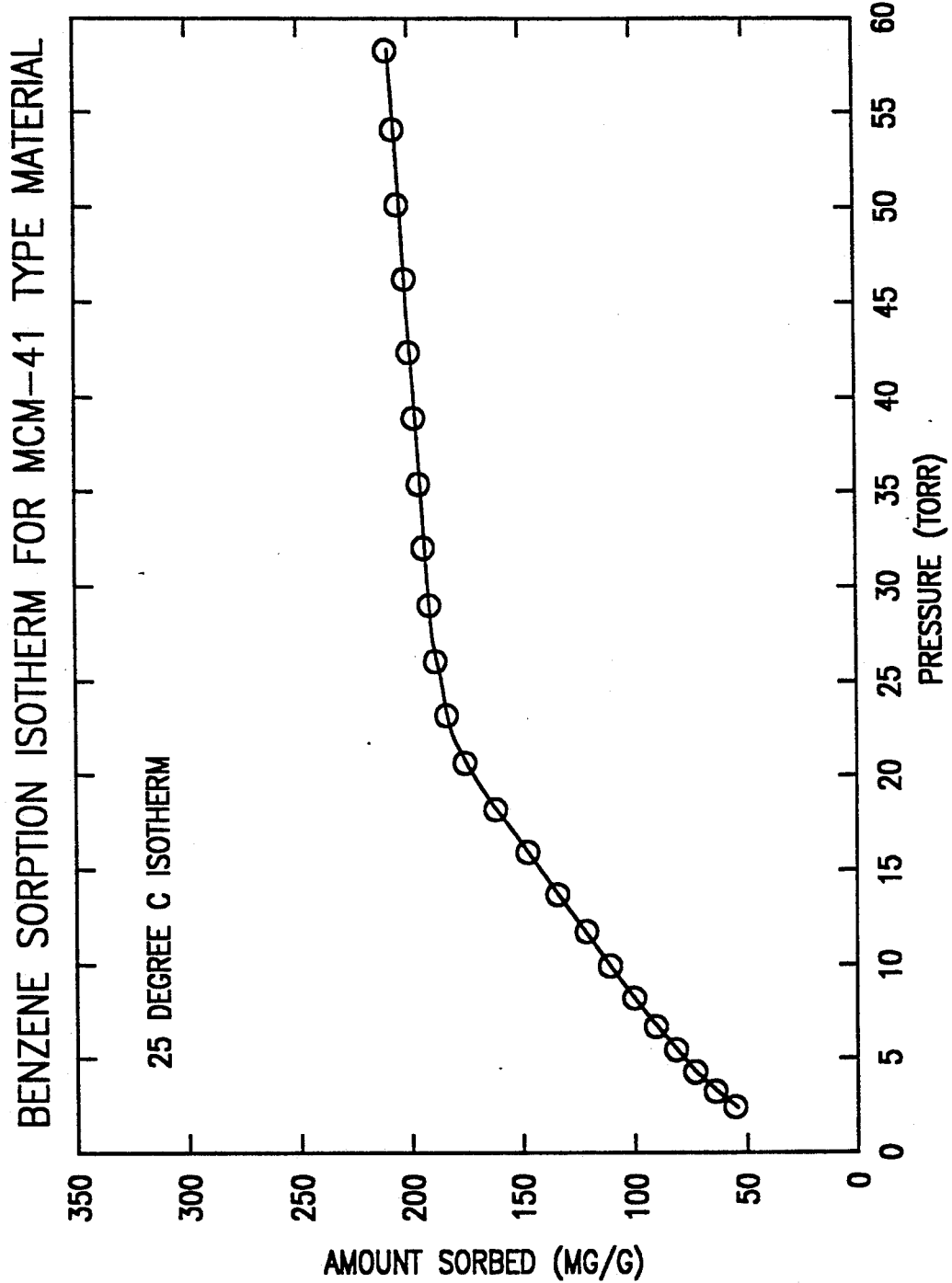

Water (28.6 grams), phosphoric acid (18.4 grams - 85%), Catapal alumina SB (10.0 grams), cobalt nitrate hexahydrate (3.8 grams), and CTMAOH (100 grams) were combined. This mixture was placed in a steam box for ten days. The resultant product was filtered, washed, and air-dried. The product exhibited XRD peaks indicative of a dense phase—the major peak was at approximately 21 degrees two theta. Ten grams of the air-dried material was combined with 20 grams of water, 80 grams of the CTMAOH solution, and 46.6 grams of a tetrabutlyammonium (TBA) silicate solution (prepared by combining 168 grams of tetraethylorthosilicate with 270 grams of 55% TBAOH). This mixture was placed in a steam box for 72 hours. The product was then filtered, washed, air-dried and calcined (10 hours at 540° C. in air). The XRD pattern of the calcined product is shown in FIG. 27. The d-spacing of the low angle peak is approximately 33 angstroms. TEM indicated that this product contained the present ultra large pore material. The benzene adsorption at 25° C. is shown in FIG. 28.

All of the x-ray diffraction patterns of the materials of Examples 5 and 24 to 26 exhibit only one low angle line after calcination. This may be due to a lack of optimization of the synthesis conditions for these phosphate-containing materials since the formation of the mesoporous materials is done at relatively high pH (>10) as a result of the high concentration of both CTMAOH and TMA silicate.

The successful synthesis of the phosphate-containing mesoporous structures all involved a two step procedure in which the [Me]AlPO₄ was formed in the first step and subsequently reacted with the surfactant and silica source.

The chemical analyses of the four phosphorus-containing materials obtained from step i) of the synthesis procedure of Examples 5, and 24 to 26 are included in Table I below. Table II illustrates the changes of the molar ratios of the elements from step i) of the synthesis step to step ii) where the mesoporous material was formed. For Example 5, no analyses of the initial material of step i) were done, so the molar ratios are assumed to be equivalent to those obtained for AlPO₄-21 in U.S Pat. No. 4,310,440, Example 51 from which the preparation was taken. In all four final products, the addition of the silica resulted in a substantial decrease in the relative phosphorus content, suggesting a substitution of silicon for phosphorus in the formation of the SAPO structures. In Example 26, the Co/Al ratio remained constant with the addition of silica in the second step.

TABLE I

ELEMENTAL ANALYSES OF SYNTHESIS PRODUCTS
Elemental Analyses, wt %

| Sample ID | Co | C | N | P | Al | Si | Ash, 1000° C. |
|---|---|---|---|---|---|---|---|
| Ex. 5* | — | — | — | 0.79 | 24.0 | 53.9 | 83.9 |
| Ex. 24(i) | — | 28.17 | 2.49 | 8.34 | 6.31 | — | 28.84 |
| Ex. 24 | — | 37.50 | 2.15 | 1.37 | 5.07 | 13.01 | 42.70 |
| Ex. 25(i) | — | 18.34 | 1.01 | 6.55 | 5.93 | — | 32.05 |
| Ex. 25 | — | 28.53 | 2.26 | 5.06 | 7.08 | 18.41 | 34.23 |
| Ex. 26(i) | 4.30 | 2.16 | >0.5 | 17.45 | 14.58 | — | 73.40 |
| Ex. 26 | 1.62 | 32.04 | 1.83 | 8.54 | 10.99 | 25.22 | 47.95 |

*Analyses obtained after calcination at 540° C. in air for ten hours.

TABLE II

| PRODUCT ELEMENTAL MOLAR RATIOS | |
|---|---|
| Sample ID | Metal/Al/P/Si Ratio |
| Ex. 5(i) | —/1/1/— |
| Ex. 5 | —/1/0.03/2.2 |
| Ex. 24(i) | —/1/1.2/— |
| Ex. 24 | —/1/0.24/2.6 |
| Ex. 25(i) | —/1/0.96/— |
| Ex. 25 | —/1/0.51/2.2 |
| Ex. 26(i) | 0.14/1/1.1/— |
| Ex. 26 | 0.13/1/0.55/1.9 |

What is claimed is:

1. A method for preparing a composition of matter comprising an inorganic, porous, non-layered crystalline phase material exhibiting, after calcination, an X-ray diffraction pattern with at least one peak at a d-spacing greater than 18 Angstrom Units and having a benzene adsorption capacity of greater than 15 grams benzene per 100 grams of said material at 6.7 kPa (50 torr) and 25° C., and a composition, expressed on an anhydrous basis as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; $(a+b+c+d)=1$; $a \geq 0$; b, c, and d are each $>0$; and h is a number of from 1 to 2.5, said method comprising:

i) crystallizing a first reaction mixture having a composition in terms of mole ratios of oxides, within the following ranges:

| | |
|---|---|
| $WO/X_2O_3$ | 0.0 to 0.5 |
| $Z_2O_5/X_2O_3$ | 0.5 to 5 |
| $(WO + X_2O_3)/Z_2O_5$ | 0.2 to 3 |
| Solvent/ | 4 to 500 |
| $(WO + X_2O_3 + Z_2O_5)$ | |
| $(M_{2/e}O + R_{2/f}O + R'_{2/g}O)/$ | 0.05 to 5 |
| $(WO + X_2O_3 + Z_2O_5)$ | |
| $R'_{2/g}O/R_{2/f}O$ | $\geq 0$ | wherein e, f and g are the weighted average valences of M, R and R', respectively, wherein the solvent is a $C_1$ to $C_6$ alcohol or diol, or water and wherein R comprises an organic directing agent selected from the group consisting of aromatic amines, cyclic aliphatic amines and polycyclic aliphatic amines, and R' comprises an organic directing agent having the formula $R_1R_2R_3R_4Q^+$, wherein Q is nitrogen or phosphorus and at least one of $R_1$, $R_2$, $R_3$ and $R_4$ is aryl or alkyl group having 6 to 36 carbon atoms and each of the remainder of $R_1$, $R_2$, $R_3$ and $R_4$ is selected from hydrogen and an alkyl group having 1 to 5 carbon atoms;

ii) contacting the crystallized product of i) with a second reaction mixture having a composition in terms of mole ratios of oxides, within the following ranges:

| | |
|---|---|
| $R'_{2/g}O/YO_2$ | 0.05 to 2 |
| Solvent/$YO_2$ | 20 to 1000 | wherein the product of i) is added to provide a mixture having 0.1 to 2 moles of $X_2O_3$ per mole of $YO_2$ in the reaction mixture; and iii) maintaining the product of ii) under conditions sufficient to form said composition of matter.

2. The method of claim 1 wherein said crystalline phase material has a hexagonal arrangement of uniformly-sized pores having diameters of at least about 15 Angstrom Units, and exhibiting a hexagonal electron diffraction pattern that can be indexed with a $d_{100}$ value greater than about 18 Angstrom Units; wherein $(a+b+c)$ is greater than d, and $h=2$; W is selected from the group consisting of divalent first row transition metals and magnesium; X is selected from the group consisting of aluminum, boron, chromium, gallium, and iron; Y is selected from the group consisting of silicon and germanium; Z is selected from the group consisting of phosphorus and arsenic, said first reaction mixture having a composition in terms of mole ratios of oxides, within the following ranges:

| | |
|---|---|
| $WO/X_2O_3$ | 0.0 to 0.25 |
| $Z_2O_5/X_2O_3$ | 0.8 to 1.2 |
| $(WO + X_2O_3)/Z_2O_5$ | 0.8 to 1.2 |
| Solvent/ | 10 to 200 |
| $(WO + X_2O_3 + Z_2O_5)$ | |
| $(M_{2/e}O + R_{2/f}O + R'_{2/g}O)/$ | 0.15 to 3 |
| $(WO + X_2O_3 + Z_2O_5)$ | |
| $R'_{2/g}O/R_{2/f}O$ | $\geq 0$ | wherein R comprises an organic directing agent selected from the group consisting of aromatic amines and R' comprises an organic directing agent having the formula $R_1R_2R_3R_4Q^+$, wherein Q is nitrogen and at least one of $R_1$, $R_2$, $R_3$ and $R_4$ is aryl or alkyl group having 6 to 36 carbon atoms and each of the remainder of $R_1$, $R_2$, $R_3$ and $R_4$ is selected from hydrogen and an alkyl group having 1 to 5 carbon atoms; and said second reaction mixture having a composition in terms of mole ratios of oxides, within the following ranges:

| | |
|---|---|
| $R'_{2/g}O/YO_2$ | 0.3 to 1.0 |
| Solvent/$YO_2$ | 30 to 400 | wherein the product of i) is added to provide a mixture having 0.1 to 2 moles of $X_2O_3$ per mole of $YO_2$ in the reaction mixture.

iii) maintaining the mixture of ii) under conditions sufficient to form said composition of matter.

3. The method of claim 1 wherein W is selected from the group consisting of cobalt, chromium, and nickel; X is aluminum; Y is silicon and Z is phosphorus; said solvent comprises water; R comprises pyrrolidine; R' is selected from the group consisting of cetyltrimethylammonium, cetyltrimethylphosphonium, octadecyltrimethylphosphonium, cetylpyridinium, myristyltrimethylammonium, decyltrimethylammonium, dodecyltrimethylammonium, and dimethyldidodecylammonium compounds and R' comprises 50 to 99 weight percent of an additional organic directing agent having the formula R' $R_1R_2R_3R_4Q^+$, wherein Q is nitrogen and each of $R_1$, $R_2$, $R_3$ and $R_4$ is selected from hydrogen and an alkyl group of 1 to 5 carbon atoms; said first reaction mixture having a composition in terms of mole ratios of oxides, within the following ranges:

| | |
|---|---|
| $WO/X_2O_3$ | 0 to 0.25 |
| $Z_2O_5/X_2O_3$ | 0.8 to 1.2 |
| $(WO + X_2O_3)/Z_2O_5$ | 0.8 to 1.2 |
| Solvent/ | 10 to 200 |
| $(WO + X_2O_3 + Z_2O_5)$ | |
| $(M_{2/e}O + R_{2/f}O + R'_{2/g}O)/$ | 0.15 to 3 |
| $(WO + X_2O_3 + Z_2O_5)$ | | and said second reaction mixture having a composition in terms of mole ratios of oxides, within the following ranges:

| | |
|---|---|
| $R'_{2/g}O/YO_2$ | 0.3 to 1.0 |
| Solvent/$YO_2$ | 30 to 400 | wherein the product of i) is added to provide a mixture having 0.1 to 2 moles of $X_2O_3$ per mole of $YO_2$ in the reaction mixture.

4. The method of claim 3 wherein said additional organic directing agent is selected from tetramethylammonium, tetraethylammonium, tetrapropylammonium and tetrabutylammonium compounds.

5. The method of claim 3 wherein a = 0 and h = 2.

6. The method of claim 1 wherein step i) comprises crystallizing conditions comprising a temperature of 25° to 250° C. for 6 to 200 hours; and step iii) comprises conditions comprising a temperature of 25° to 150° C. for 2 to 96 hours.

7. The method of claim 1 wherein step i) comprises crystallizing conditions comprising a temperature of 100° to 200° C. for 4 to 48 hours; and step iii) comprises conditions comprising a temperature of 50° to 150° C. for 4 to 48 hours.

8. The method of claim 1 wherein a source of $YO_2$ in the second reaction mixture is organic silicate.

9. The method of claim 8 wherein said organic silicate is quaternary ammonium silicate.

10. A composition of matter comprising an inorganic, porous, non-layered crystalline phase material exhibiting, after calcination, an X-ray diffraction pattern with at least one peak at a d-spacing greater than about 18 Angstrom Units and having a benzene adsorption capacity of greater than 15 grams benzene per 100 grams of said material at 6.7 kPa (50 torr) and 25° C., and a composition, expressed on an anhydrous basis as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; $(a+b+c+d)=1$; $a \geqq 0$; b, c, and d are each > 0; and h is a number of from 1 to 2.5.

11. The composition of matter of claim 10 wherein said crystalline phase material has a hexagonal arrangement of uniformly-sized pores having diameters of at least about 15 Angstrom Units; and exhibiting, after calcination, a hexagonal electron diffraction pattern that can be indexed with a $d_{100}$ value greater than 18 Angstrom units, wherein W is selected from the group consisting of divalent first row transition metals and magnesium; X is selected from the group consisting of aluminum, boron, chromium, gallium, and iron; Y is selected from the group consisting of silicon and germanium; Z is selected from the group consisting of phosphorus and arsenic.

12. The composition of matter of claim 11 wherein W is selected from the group consisting of cobalt, chromium, and nickel; X is aluminum; Y is silicon and Z is phosphorus.

13. The composition of matter of claim 12 wherein a=0.

14. The composition of matter of claim 10 having an X-ray diffraction pattern substantially as shown in FIG. 5.

15. The composition of matter of claim 10 having an X-ray diffraction pattern substantially as shown in FIG. 22.

16. The composition of matter of claim 10 having an X-ray diffraction pattern substantially as shown in FIG. 24.

17. The composition of matter of claim 10 having an X-ray diffraction pattern substantially as shown in FIG. 27.

* * * * *